United States Patent
Shafer

(10) Patent No.: US 7,735,740 B2
(45) Date of Patent: Jun. 15, 2010

(54) RICH OBJECT MODEL FOR DIVERSE AUTO-ID TAGS

(75) Inventor: Steven Arthur Nolan Shafer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 11/166,933

(22) Filed: Jun. 24, 2005

(65) Prior Publication Data
US 2006/0289647 A1 Dec. 28, 2006

Related U.S. Application Data

(63) Continuation of application No. 11/156,952, filed on Jun. 20, 2005, now Pat. No. 7,455,218.

(51) Int. Cl.
*G06K 19/00* (2006.01)
(52) U.S. Cl. .................. 235/487; 235/380; 235/375
(58) Field of Classification Search ........... 235/375, 235/380, 382, 487, 494
See application file for complete search history.

(56) References Cited

U.S. PATENT DOCUMENTS

| | | | |
|---|---|---|---|
| 6,025,780 A | 2/2000 | Bowers et al. |
| 6,202,925 B1 | 3/2001 | Machii et al. |
| 6,213,392 B1 | 4/2001 | Zuppicich |
| 6,480,100 B1 | 11/2002 | Frieden et al. |
| 6,783,060 B2 | 8/2004 | Marappan |
| 6,933,849 B2 | 8/2005 | Sawyer |
| 7,016,311 B2 | 3/2006 | Tiernay et al. |
| 7,021,535 B2 | 4/2006 | Overhultz et al. |
| 7,035,818 B1 | 4/2006 | Bandy et al. |
| 7,166,230 B2 | 1/2007 | Klowak |
| 7,180,422 B2 | 2/2007 | Milenkovic et al. |
| 7,350,708 B2 | 4/2008 | Melick et al. |
| 7,420,466 B2 | 9/2008 | Shafer |
| 7,455,218 B2 | 11/2008 | Shafer |
| 7,484,664 B2 | 2/2009 | Shafer |
| 2002/0076819 A1 | 6/2002 | Bowman et al. |
| 2005/0092825 A1 | 5/2005 | Cox et al. |
| 2005/0092844 A1 | 5/2005 | Zhang et al. |

(Continued)

OTHER PUBLICATIONS

In the United States Patent and Trademark Office, in re: U.S. Appl. No. 11/156,952, filed Jun. 20, 2005, Non-Final Office Action dated Aug. 27, 2008, 4 pages.

(Continued)

*Primary Examiner*—Karl D. Frech
(74) *Attorney, Agent, or Firm*—Woodcock Washburn LLP

(57) ABSTRACT

A system and method allowing one application to implement diverse AutoID tags interchangeably, by unifying all AutoID technologies into a single object model. The single object model interacts with all AutoID technologies, with only a lowest level device tailored to the specific AutoID technology, the single object model thereby persisting through the middleware, up to an application, carrying all necessary information from any AutoID technology. The single object model can interact with a tag many times, as necessary to complete an operation. A reader interface allows an application to communicate with multiple readers of diverse AutoID tags, and to communicate with individual servers communicating with individual readers of diverse AutoID tags. The reader interface also provides a single interface for hardware communication with a radio, for an application interacting with an entire network of readers, sensors, interpretation steps, product lookup, and information storage providing a single virtual reader.

19 Claims, 24 Drawing Sheets

U.S. PATENT DOCUMENTS

| | | | |
|---|---|---|---|
| 2005/0145688 A1* | 7/2005 | Milenkovic et al. | ......... 235/375 |
| 2005/0150953 A1 | 7/2005 | Alleshouse | |
| 2005/0200453 A1 | 9/2005 | Turner et al. | |
| 2006/0016875 A1 | 1/2006 | Bonalle et al. | |
| 2006/0043165 A1 | 3/2006 | Kumar et al. | |
| 2006/0163338 A1 | 7/2006 | Allen et al. | |
| 2006/0247984 A1 | 11/2006 | Shawe | |
| 2006/0289646 A1 | 12/2006 | Shafer | |

OTHER PUBLICATIONS

In the United States Patent and Trademark Office, in re: U.S. Appl. No. 11/156,952, filed Jun. 20, 2005, Notice of Allowance and Fee(s) Due dated Jul. 24, 2008, 6 pages.

In the United States Patent and Trademark Office, in re: U.S. Appl. No. 11/158,698, filed Jun. 22, 2005, Advisory Action dated Sep. 30, 2008, 3 pages.

In the United States Patent and Trademark Office, in re: U.S. Appl. No. 11/158,698, filed Jun. 22, 2005, Final Office Action dated Aug. 5, 2009, 9 pages.

In the United States Patent and Trademark Office, in re: U.S. Appl. No. 11/158,698, filed Jun. 22, 2005, Final Office Action dated Jun. 13, 2008, 10 pages.

In the United States Patent and Trademark Office, in re: U.S. Appl. No. 11/158,698, filed Jun. 22, 2005, Final Office Action dated May 15, 2007, 8 pages.

In the United States Patent and Trademark Office, in re: U.S. Appl. No. 11/158,698, filed Jun. 22, 2005, Non-Final Office Action dated Jan. 21, 2009, 7 pages.

In the United States Patent and Trademark Office, in re: U.S. Appl. No. 11/158,698, filed Jun. 22, 2005, Non-Final Office Action dated Jun. 20, 2006, 7 pages.

In the United States Patent and Trademark Office, in re: U.S. Appl. No. 11/158,698, filed Jun. 22, 2005, Non-Final Office Action dated Nov. 17, 2006, 6 pages.

In the United States Patent and Trademark Office, in re: U.S. Appl. No. 11/158,698, filed Jun. 22, 2005, Non-Final Office Action dated Nov. 29, 2007, 8 pages.

In the United States Patent and Trademark Office, in re: U.S. Appl. No. 11/158,698, filed Jun. 22, 2005, Notice of Allowance and Fee(s) Due dated Dec. 7, 2009, 4 pages.

In the United States Patent and Trademark Office, in re: U.S. Appl. No. 11/158,874, filed Jun. 22, 2005, Non-Final Office Action dated Mar. 14, 2008, 7 pages.

In the United States Patent and Trademark Office, in re: U.S. Appl. No. 11/158,874, filed Jun. 22, 2005, Notice of Allowance and Fee(s) Due dated Sep. 24, 2008, 7 pages.

In the United States Patent and Trademark Office, in re: U.S. Appl. No. 11/167,021, filed Jun. 24, 2005, Non-Final Office Action dated Dec. 31, 2007, 5 pages.

In the United States Patent and Trademark Office, in re: U.S. Appl. No. 11/167,021, filed Jun. 24, 2005, Non-Final Office Action dated Jun. 26, 2007, 8 pages.

In the United States Patent and Trademark Office, in re: U.S. Appl. No.11/167,021, filed Jun. 24, 2005, Notice of Allowance and Fee(s) Due dated May 2, 2008, 4 pages.

In the United States Patent and Trademark Office, in re: U.S. Appl. No. 11/158,698, filed Jun. 22, 2005, Advisory Action dated Jul. 27, 2007, 3 pages.

* cited by examiner

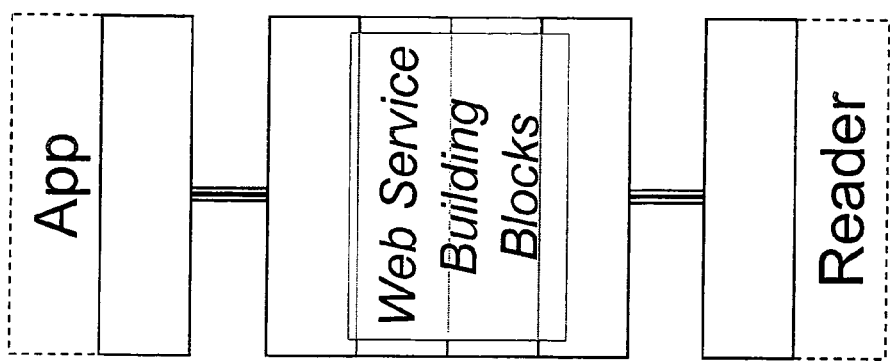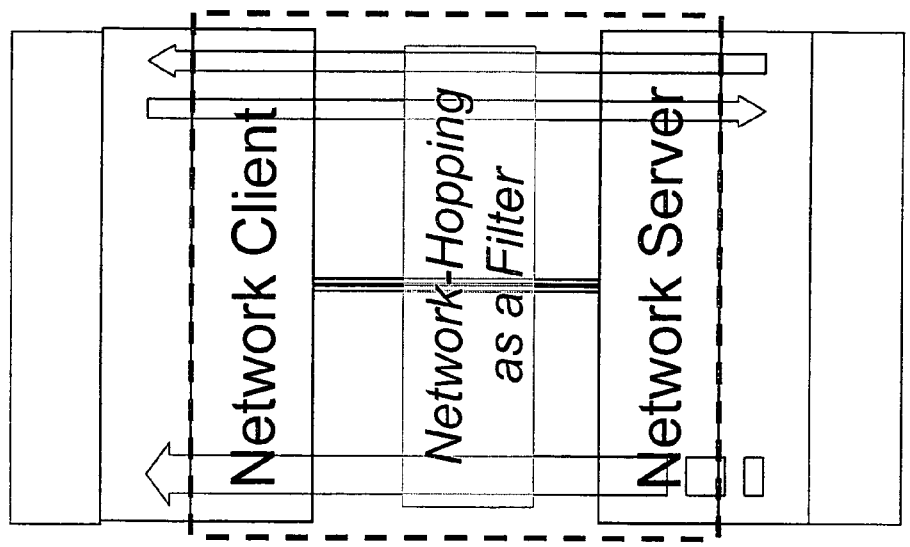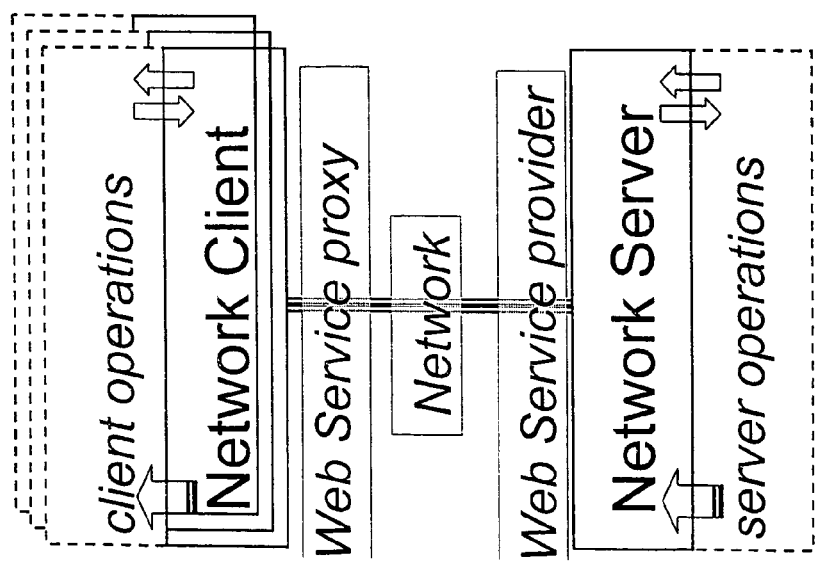
FIG 21

RICH OBJECT MODEL FOR DIVERSE AUTO-ID TAGS

RELATED APPLICATIONS

This application is a continuation of the U.S. patent application Ser. No. 11/156,952, entitled RICH OBJECT MODEL FOR DIVERSE AUTO-ID TAGS, filed Jun. 20, 2005 now U.S. Pat. No. 7,455,218, in the name of Steven A. N. Shafer; which application is incorporated herein by reference.

FIELD OF THE INVENTION

The present invention is directed to a system and methods for implementing diverse AutoID tags.

BACKGROUND OF THE INVENTION

There are many types of AutoID tags in use today including bar codes, magnetic stripe cards, smartcards, contactless smart cards, RFID, sensor nodes, and others. Today, some applications are specific to a particular technology (usually a particular manufacturer). If a device in a particular technology includes unique features, the middleware understands the unique features because of the single application written for the device. The application can use the unique features because the application, the middleware and the device all correspond to an identical model of the unique features.

Other applications, corresponding to most systems is use today, are generic for many kinds of AutoID tags, providing many device types and applications, but communication of data in these applications is reduced to a lowest common denominator, preserving only an identification number of a given AutoID tag. That is, all capabilities of respective devices in these systems are abstracted or extracted away, with only the identification (ID) number or string being communicated from a device to an application. Generic applications cannot exercise other features of AutoID tags such as writable memory, security handshaking, attached sensors or other devices, etc.

What is needed is the ability to provide a given application a capability of using many different forms of AutoID tags interchangeably. What is needed is an IDTag object model in middleware capable of propagating a model of unique features to respective applications. Accordingly, many different applications could advantageously use the features based on a description of the features, or based on a description of specific pieces of hardware that implement the features.

SUMMARY OF THE INVENTION

The present invention is directed to a system and method for implementing diverse AutoID tags. The present invention overcomes the drawbacks and shortcomings of the prior art by providing a capability that allows the same compiled application to use many different forms of AutoID tags interchangeably. For example, a single inventory application system could write an ID number and owner's name onto a 'tag' whether that tag is RFID, magnetic stripe, or a custom IR badge, as long as the tag has available memory. Accordingly, the present invention allows applications to exercise features for writable memory and security interactions in a technology-independent way. The invention also exposes other hardware-specific features in a unified framework.

The present invention unifies all AutoID technologies into a single object model, so that a single program can be written to interact with all of the technologies, and only a lowest level device in a system need be tailored to the specific technology of the AutoID device. Once an object model and IDTag is fulfilled, then an object model can persist all the way through the middleware, up to an application, and can carry necessary information from any of the AutoID technologies.

One aspect of the present invention is an IDTag model, which is an object model representing any one of the AutoID technology units. For example, one representation or observation of a barcode label, one representation of a RFID tag reading, etc. The IDTag object model can also persist for interaction with a tag many times, which often occurs before an operation is complete. For example, the presence of an AutoID tag is detected, and an IDTag object instance is created. Perhaps later more data is required from a tag; the IDTag object model can be examined to see if the required data is there, if not, a reader is instructed to read the additional data, and the additional data is inserted into the IDTag object model for future use. Accordingly, the IDTag object model represents one physical object, and can persist over many uses.

Another aspect of the invention is a reader interface, also referred to as a Virtual Reader, which is an abstract description of an interface to a reader device, or a software process conceptualizing multiple reader devices or large scale sensors. Accordingly, the reader interface of the present invention allows an application to communicate with a whole assembly, having multiple readers of diverse Auto ID tags, and also to communicate with each individual server that communicates with each individual reader in the whole assembly.

Generally, different interfaces are used at different levels of a system. The reader interface of the present invention also provides that a single interface can be used from a hardware that communicates with a radio, all the way up to an application interacting with an entire network of sensors, interpretation steps, product lookup, and information storage all compiled together to implement one "virtual reader" whose reports are not raw tag data, but are actually highly-processed, smooth filtered, aggregated data.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings:

FIGS. 18-22 illustrate various tasks accomplished through use of programming devices, or filters, of the present invention, such as product look up, configuration information hiding hardware details, buffering data, producing statistics and traffic reports, and aggregating multiple readers to look like one single reader at a virtual level;

DETAILED DESCRIPTION OF ILLUSTRATIVE EMBODIMENTS

Example Computing Environment

Figure 1:
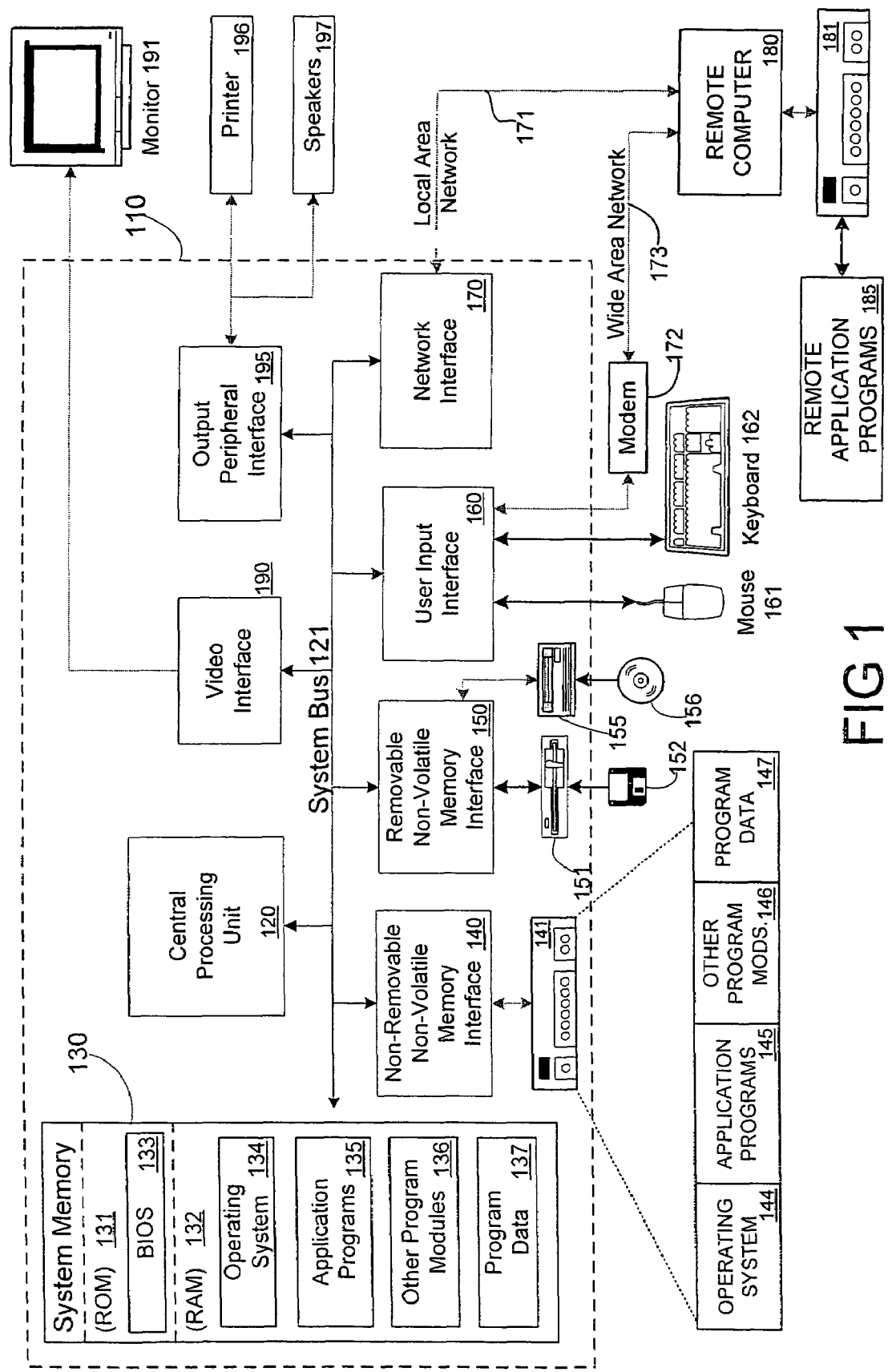
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

THE PRESENT INVENTION

The term AutoID, in the present invention, refers to any technology involving small mobile labels having some identification characteristic capable of being read by a sensor and fed into a computer system. AutoID includes barcodes, magnetic stripe cards, smartcards, contact with smartcards, RFID, even "blue tooth" devices, and may include other related or similar devices.

The present invention unifies all AutoID technologies into a single object model, so that a single program can be written to interact with all of the technologies, and only a lowest level device in a system need be tailored to the specific technology of the AutoID device. Once an object model and IDTag is fulfilled, then an object model can persist all the way through the middleware, up to an application, and can carry necessary information from any of the AutoID technologies.

The present invention can roughly be divided into two parts. One part is the IDTag model, which is the object model representing any one of the AutoID technology units. For example, one representation or observation of a barcode label, one representation of a RFID tag reading, etc. But the IDTag object model also persists for interaction with a tag many times, which often occurs before an operation is complete. For example, the presence of an AutoID tag is detected, and an IDTag object instance is created. Perhaps later more data is required from a tag; the IDTag object model can be examined to see if the required data is there, if not, a reader is instructed to read the additional data, and the additional data is inserted into the IDTag object model for future use. Accordingly, the IDTag object model represents one physical object, and can persist over many uses.

The second part of the invention is a reader interface, referred to as IIDTagReporter interface. The IIDTagReporter interface may also be referred to as a Virtual Reader, in that it is an abstract description of an interface to a reader device, or a software process conceptualizing multiple reader devices or large scale sensors. For example, an institution might have 100 readers, the data from all these readers could be sent to a central processing facility where an application might view the data as coming from "one virtual reader." With the present invention, the application could use the same abstract interface to communicate with a whole assembly, and with each individual server that communicates with each individual reader.

Generally, different interfaces are used at different levels of a system. IIDTagReporter provides that a single interface can be used from a hardware that communicates with a radio, all the way up to an application interacting with an entire network of sensors, interpretation steps, product lookup, and information storage all compiled together to implement one "virtual reader" whose reports are not raw tag data, but are actually highly-processed, smooth filtered, aggregated data.

Figure 2:
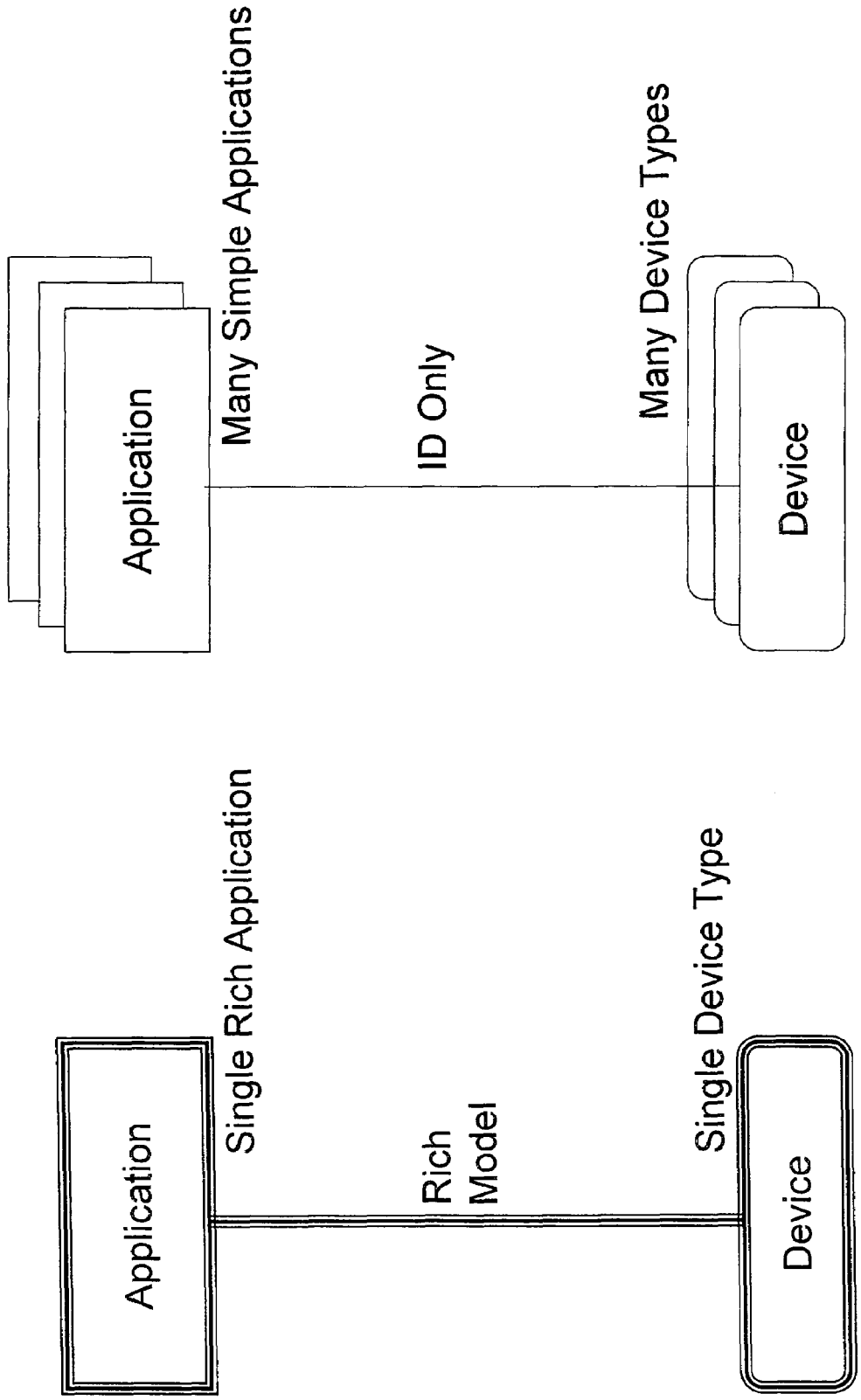
FIG. 2 illustrates two models provided in current IDTag interoperability systems for interacting between a device and an application.

FIG. 2 illustrates two models provided in current systems for interacting between a device and an application. One model includes a device with unique features, and a single application written for the device, with middleware understanding the unique features. The application can use the unique features because the application, the middleware and the device all correspond to an identical model of the unique features. The second model illustrated, which corresponds to most current systems, provides many device types and many applications, but communication of data is reduced to a lowest common denominator. That is, all capabilities of the respective devices are abstracted or extracted away, except an identification (ID) number or string. Only the ID is communicated from a device to an application. If a device has writable memory, that would not be communicated. If the device has security mechanisms, they would not be reflected in the application. If the device has sensors attached, they would not be communicated. Any unique feature included in a device would not pass through the middleware, and would not be exposed to the application.

Figure 3:
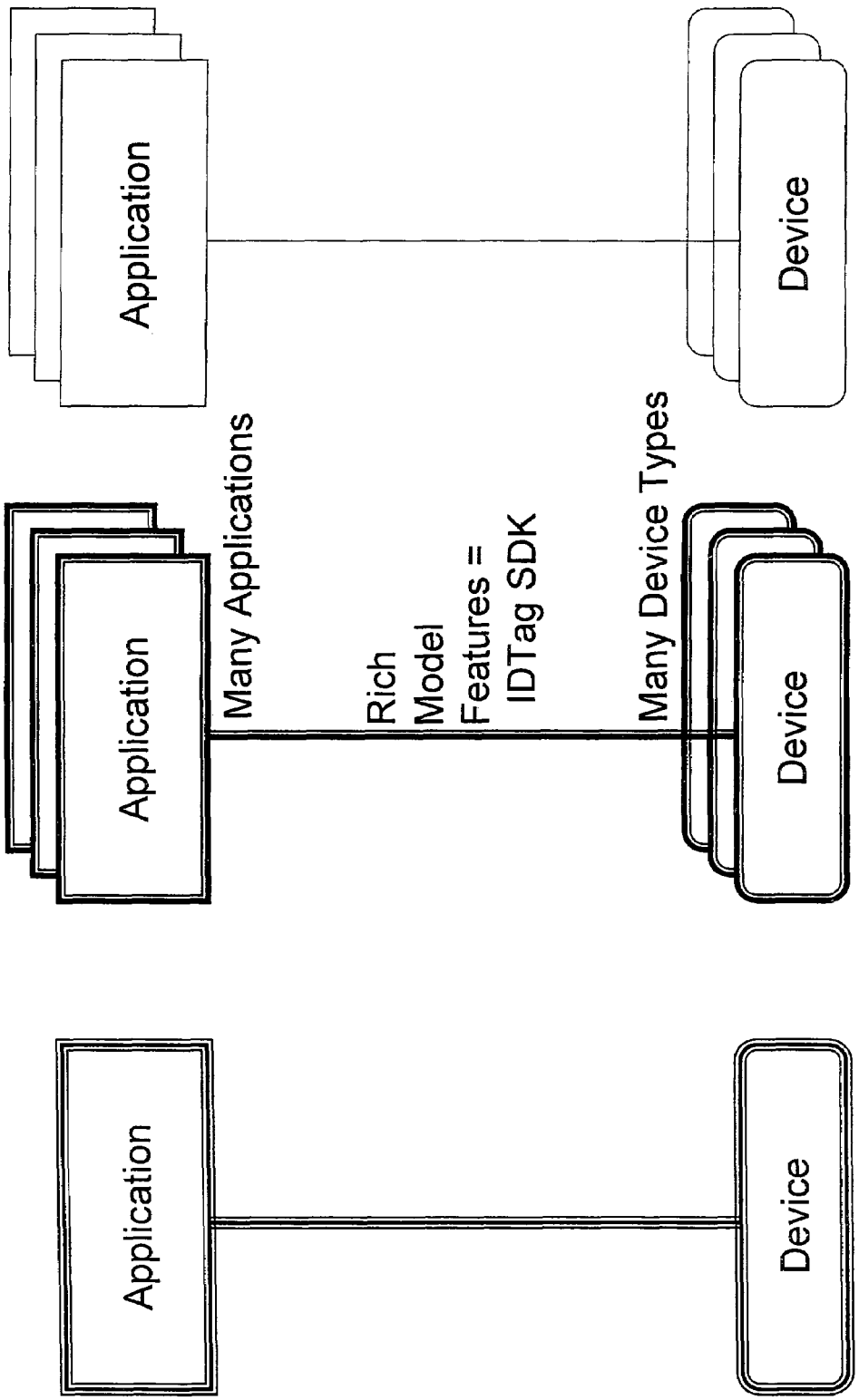
FIG. 3 introduces a third model to FIG. 2, the model including many device types having unique features, and where an IDTag object model in the middleware propagates a model of the unique features to respective applications.

FIG. 3 introduces a third model (in the center) of ID Tag interoperability, which includes many device types having unique features, and where an IDTag object model in the middleware propagates a model of the unique features to respective applications. Accordingly, many different applications can advantageously use the features based on a description of the features (i.e., a description of specific pieces of hardware that implement the features). The present invention provides this operability.

IDTag Object Model

This section presents uses and design for an object model of ID (identification) tags of the present invention, called IDTag. This model is intended to represent ID tags of all varieties, including RFID (Radio Frequency Identification) tags; SmartCards and NFC; bar codes; magnetic stripe codes; and any similar labels. The IDTag model allows all ID tag technologies to be processed by the same middleware software.

IDTags are self-describing enough to allow middleware to propagate them, sort them, perform event filtering, etc. However, in some embodiments, the level of self-description does not allow middleware to "discover" advanced tag control paradigms at run-time. If tags have advanced capabilities, such as attached sensors, it is assumed that the application will already know how to exercise these capabilities. The IDTag in these cases merely carries the representation between the device driver and the application.

Figure 4:
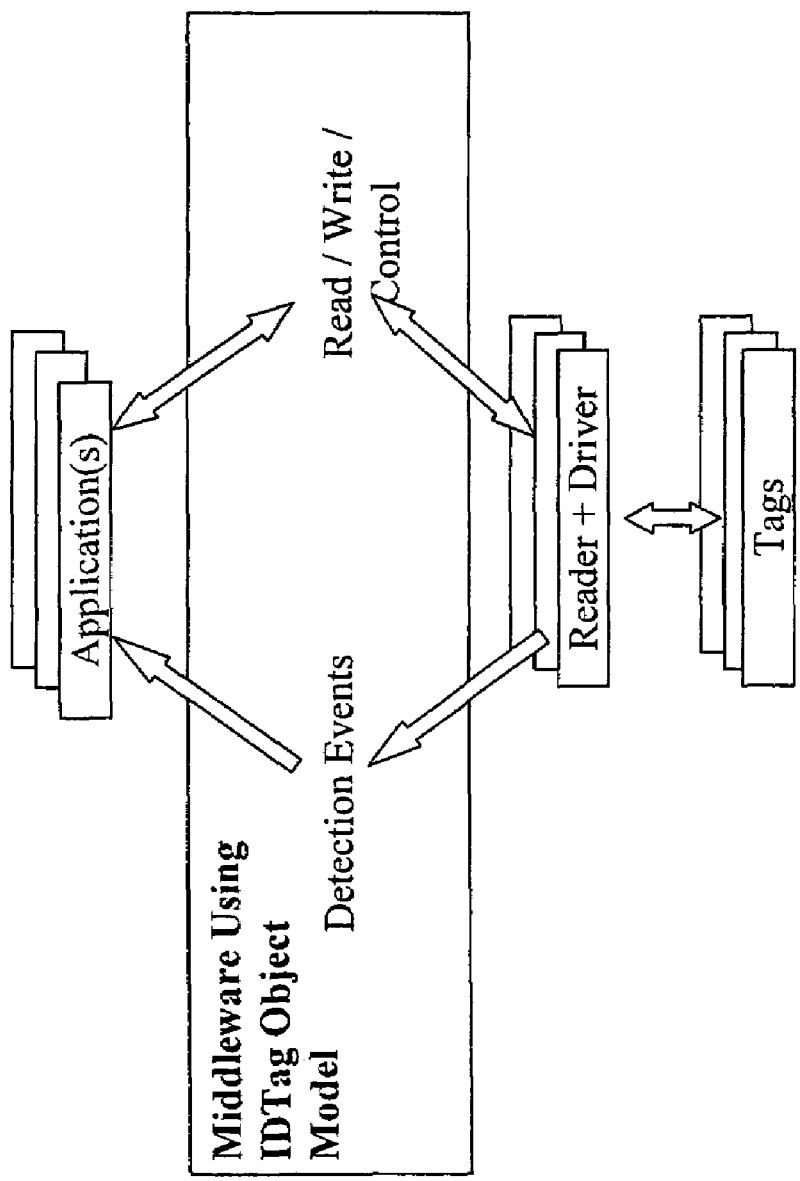
FIG. 4 illustrates an IDTag object model of the present invention, which allows middleware to perform event detection and filtering, and to pass detection events and read/write/control commands between tag readers and applications.

Referring now to FIG. 4, the IDTag object model allows middleware to perform event detection and filtering, and to pass detection events and read/write/control commands between tag readers and applications, for all types of ID tags including RFID, bar codes, SmartCards, etc.

The IDTag of the present invention includes enough explicit information to support event filtering, writable memory, and security keys; and to pass through more exotic operations (reading and writing sensors, unique hardware features, 2-way data exchange). However, for such "exotic" operations, the application and the reader driver must agree on how to use the IDTag object model to perform effective communication. In these cases, in certain embodiments of the invention, the IDTag-based middleware simply passes the operations and data back and forth as needed. The middleware is not expected to understand exotic operations nor how they are encoded in the IDTag. In this way, common middleware can be used for all types of ID tags, and different types of tags can even be mixed in the same event streams, etc.

In certain aspects of the invention, the IDTag object model is not aimed at supporting all features of all ID tag technologies; for instance, where a single type of device is talking to a single application. Such device-dependent applications might choose a different representation. However, even in these cases, the IDTag model proves useful as a framework for communication.

ASPECTS OF THE INVENTION

In certain aspects of the invention, the IDTag object model:
enables a compiled program (middleware or application) to process many kinds of ID tags.
accommodates ID fields representing characters (Unicode) or bitstrings, of arbitrary length.
enables many kinds of ID tags to coexist and to be mixed within a single data stream or data store.
provides very efficient processing of ID data from ID tags, particularly for the operations of comparing, copying, sorting, and hashing.
provides configuration available in a template that describes the overall characteristics of the tag, expressible in XML so that an XML file can be distributed and loaded to create an object model of the template in an application at run-time.
is expressible in UML, XML, as a CLR object, and as a SQL schema.
includes a mechanism for handling "Alias IDs" that are randomly generated (typically followed by security authorization and actual ID transmission).
provides a mechanism so that all significant tag types and features carry both a name (for identification) and description (for explanation).

In certain aspects of the invention directed to RFID Technologies, the IDTag:
represents all the key capabilities for EPCglobal RFID tags.
represents the key capabilities for representative legacy (pre-EPCglobal) passive and active RFID tags, both standard (ISO, AIAG, etc.) and manufacturer-specific.
represents user-writable memory, including memory that is partitioned into multiple blocks, and memory that can be blocked from writing.
carries sufficient information to allow an application to invoke operations on tags with sensors and/or other devices attached, particularly for reading, writing, and control functions.
accommodates future security regimens that utilize keys (passwords) of arbitrary length, with multiple keys for various purposes. Since the purposes cannot be known in advance, an arbitrary number of keys must be supported, with an identifier for each to denote its role.

In certain aspects of the invention directed to SmartCards and NFCIP, the IDTag
represents SmartCards or NFCIP tags, according to the ISO 14443 protocol or the ECMA NFCIP-1 or NFCIP-2 protocols.
carries sufficient information to allow an application to invoke all key operations on SmartCards and NFC cards, including security functions and data transfers.
carries sufficient information to allow a full implementation of relevant aspects of PC/SC and (U.S.) Government Interoperable Smart Card specifications.

In certain aspects of the invention directed to Bar Codes, the IDTag
represents bar codes of any length, using any symbology and any physical encoding.
represents Bar codes as Unicode strings of arbitrary length.

In certain aspects of the invention directed to Magnetic Stripe Cards, the IDTag
represents magnetic stripe cards obeying the ISO 7810 specification, Formats A and B.

In certain aspects of the invention directed to Distributed Sensor Networks, the IDTag
represents nodes in a distributed sensor network, including motes, gateways, and micro-servers.

In certain aspects of the invention directed to IHV Extensions, the IDTag
provides a way for a hardware vendor to expose state information and control functions beyond those provided in standard ID tag representations.

Design

Figure 5:
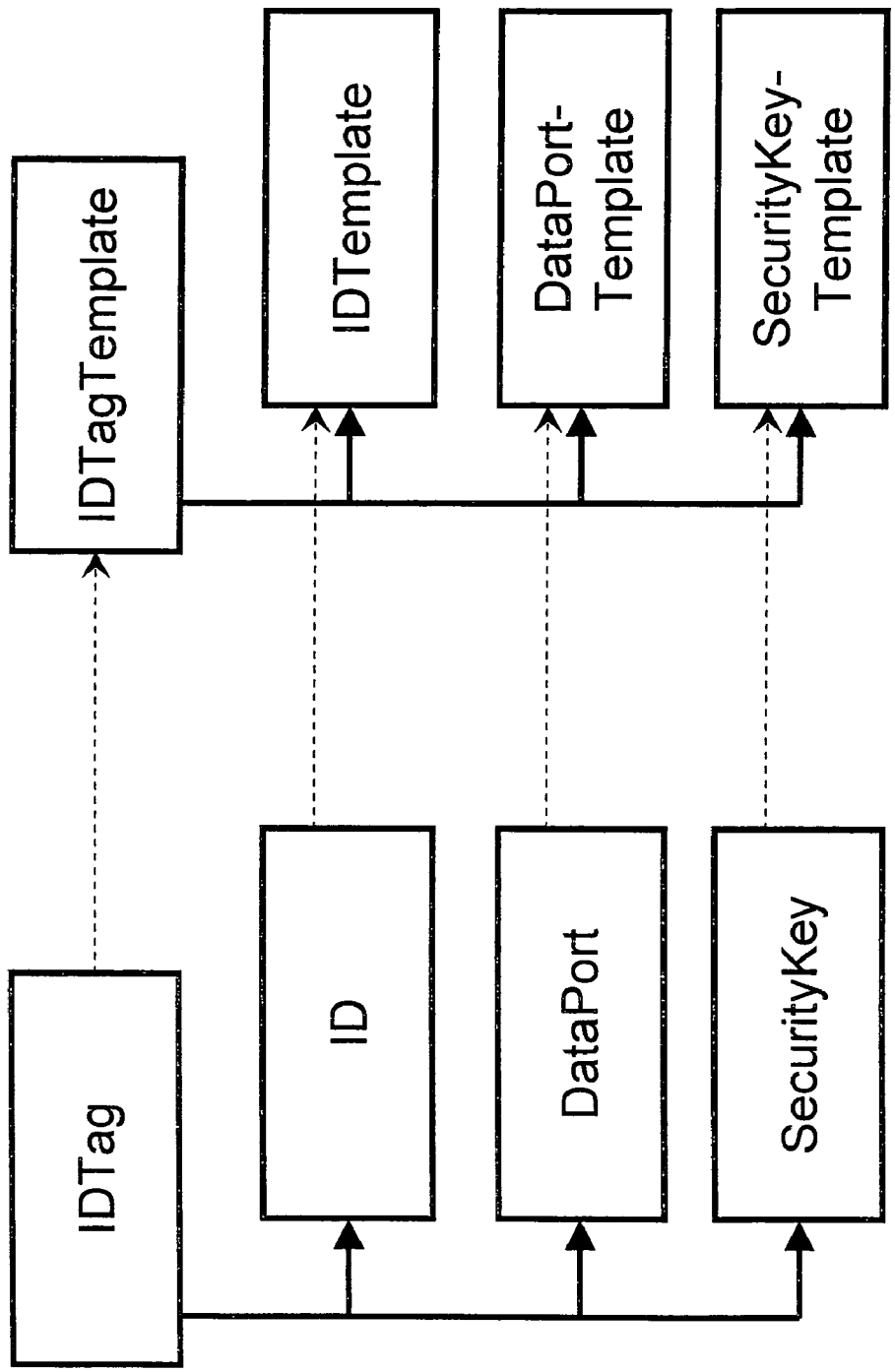
FIG. 5 illustrates an IDTag and an associated IDTag Template of the present invention, where the IDTag Template describes tag parts and capabilities, and where one template exists for each type of tag.

An IDTag represents a single tag. An IDTagTemplate represents a type of tag, for example "EPCglobal Class 1". As illustrated in FIG. 5, an IDTag follows a pattern described in an IDTagTemplate. Each major component of the IDTag is represented by a separate object (IDTag, ID, DataPort, SecurityKeySet, SecurityKey); and each of these has a corresponding template object (IDTagTemplate, IDTemplate, DataPortTemplate, SecurityKeySetTemplate, and SecurityKeyTemplate). The IDTag object and each of its components has a link to the corresponding template object.

Accordingly, the template contains information about a configuration of the tag, allowing an application to effectively take advantage of features of the tag, to determine whether the tag has features a particular application requires, whether the tag may allow the application to select a particular way of encoding data or communications with the tag and/or to accommodate the hardware on that tag. For example, an application might require 500 bytes of memory on the tag. One kind of tag might not have that much memory. So the application could determine that by examining the template. Another kind of tag might have way too much memory. So the application could simple read and write in blocks of 500. Another tag might have enough memory, but its broken into blocks of 100 bytes each. So the application would need to read and write five separate blocks to store all of the data.

Further, most readers can only read one type of tag. So, that reader would have one tag template and that tag template object would be stored in the reader and when the reader makes reports about tags, it would report the template along with the tag. It only needs to report the template once, because once the application knows the template, the application can interpret all subsequent reports received from the reader about a tag via a pointer instructing the application to which template describes the tag type. Some readers can in fact recognize more than one kind of tag, so a reader could recognize and communicate tags that have more than one template. Each template has a name, and that name is the string used to associate the tag with a template from reader to server to an application. So for each element of the IDTag Object Model, there is an corresponding element named with a template suffix.

Figure 6:
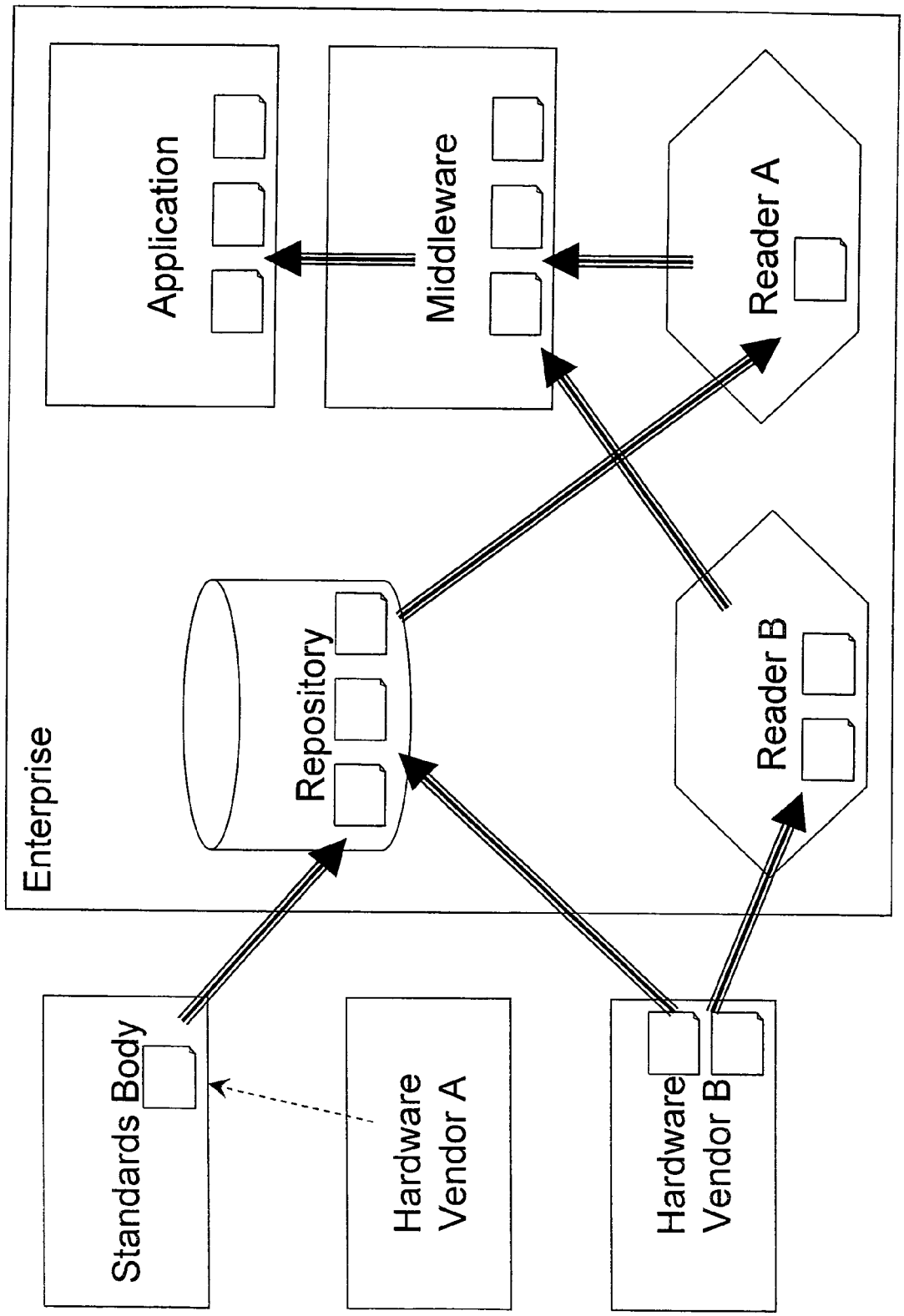
FIG. 6 illustrates IDTag Template deployment of the present invention.

The IDTag Template forms a complete object model on its own. Furthermore, there is a specified way of serializing the IDTag Template into an XML description. Having a description of the tag in XML form, one hardware vendor might encode the templates directly into the reader so that the reader comes with the templates embedded. Referring now to FIG. 6, another hardware vendor might point to a standards body controlling the XML schema, the enterprise retrieving the schema from the standards body. In any case, the schemas can be kept in a repository of the enterprise, or in the readers, and the upper layers of software can retrieve the template either from the lower layers of software, or from the central repository of the enterprise. You can imagine that different pieces of hardware have features, and imagine that some of those features are more exotic, more unique more bizarre and others are more generic. So if you reduce all tags to a simple ID number, what your saying is that you're only going to take the most generic feature and reduce everything to that. Some systems of middleware include a little bit of unique feature. ID Tag goes much further and includes many more unique features. But it still has a cut-off, and beyond that cut-off its necessary to fall back on some sort of pass-through which is beyond the scope of the ID tag object model. So that takes through the first and second major bullet items. Now lets talk about the third one which is alias IDs.

Design of IDTag Class

The IDTag represents a single tag. It comprises an ID, zero or more DataPorts of two types (ControlPorts and MemoryPorts), and a SecurityKeySet for the tag and its ID field. The design of each component is described in following sections.

In addition, several other properties can be included, such as:

CurrentAliasID is used to handle secure IDTags that do not reveal their actual ID on first contact. Each time they are scanned, such cards generate a random number (called the "Alias ID" in the IDTag SDK). To determine the actual ID, the reader device must supply a password to the tag; if accepted, the tag will then allow the reader to query for the actual ID. CurrentAliasID is used to record the Alias ID currently in effect for the tag; when a new scan is initiated, the CurrentAliasID should be discarded. CurrentAliasID is used if and only if the corresponding IDTagTemplate has a non-null AliasIDDescription property.

Note that some tags have only Alias IDs and have no actual ID at all; some middleware may be unable to process them. Example: ISO 18092 cards.

IsDescribed is a boolean that tells whether the following properties of the tag are all valid. For some tags, the tag must actually be queried separately for some or all of the following information; if so, then the reader would initially set IsDescribed to false. This tells applications that they must perform a Describe operation (see the IIDTagReporter interface) before querying for the following properties of the tag. The IIDTagReporter responsible for the tag should also perform such description automatically if one of the following properties is queried while IsDescribed is false. (Note that for many tags, the IDTagTemplate has all necessary details, so IsDescribed will always be set to true.). In other embodiments of the invention, a separate IsDescribed field is provided for each of the following properties, rather than just one field for the entire tag object TagDetails is a string to contain manufacturer's details about the tag. Different tags may use this string differently.

IsDeactivated indicates whether this tag is known to be deactivated. (It may be best to discard the IDTag object completely.) This property is meaningful only if the IDTagTemplate has IsDeactivatable set to true.

Some tags allow the ID field itself to be written by the reader; and some of these tags further allow the reader to "write-lock" the ID to prevent subsequent changes. IsIDWriteLocked indicates whether the ID field on this tag has been so protected. It is only meaningful if the corresponding IDTagTemplate has both IsIDWritable and IsIDWriteLockable set to true.

Design of the IDTagTemplate Class

In addition to the properties described above, the IDTagTemplate can include the following components:

A name (such as "EPCglobal Class 0") and a description suitable for longer display (such as in a ToolTip popup).

A set of communication protocols, denoted by strings, which may be used to communicate with tags of this type. (Example: For RFID tags, these would be the names of air protocols.) All settings required by the reader are assumed to be implied by the designation of a protocol, for example if a protocol has different parameters in the US and Europe, each parameter setting would be a separate "protocol" in the IDTagTemplate.

The number of "control operations" defined for this type of tag.

A Boolean to indicate whether this type of tag can be deactivated.

Design of the ID Class

IDs can be binary (as in most electronic ID tags) or character strings (as in most printed ID tags). Both require efficient processing for the fundamental operations of comparing, hashing, and copying. An ID can be created with either a binary (unsigned 32-bit int array) or string value. WordString is a class that represents either type of value efficiently; ID is a subclass of WordString.

If created with a binary value, comparisons etc. will be fast using the binary representation, and the string equivalent is available on demand (formatted as desired). The IsString property of the IDTemplate will be false.

If created with a string, comparisons etc. will take place using string functions. The IsString property of the IDTemplate will be true.

Additional operations on the ID include generating a random ID and incrementing the value by 1; these operations can be useful for debugging software.

ID is a subclass of WordString that adds a Name string and a Description string.

Representing Binary ID Values in the ID Class

For efficient processing, a binary ID value is represented as an array of unsigned 32-bit "words". The reader driver software is expected to convert the actual internal representation into this representation when reporting the IDs of scanned tags. The length of the array is given in the IDTemplate (ExpectedLength) unless it is variable-length (IsVariableLength is true).

All bits are considered meaningful for hashing, comparison, etc. Any meaningless bits should be set to 0 by the reader software, before the ID data is placed into an ID object instance. If there are meaningless bits in the middle of the meaningful bits, the reader software may shift the meaningful bits to eliminate the internal zero-padding bits altogether.

If the number of bits is not a multiple of 32, then the preferred representation is that all the most significant (lowest-indexed) words contain 32 meaningful bits, beginning with the most significant bits of the ID, and the last (highest-indexed) word contains the remaining bits. In any word that contains less than 32 meaningful bits, the preferred representation is that the least significant bits of the word are meaningful, i.e. the data should be right-shifted and padded with 0 bits on the left.

Generally, the authority responsible for the IDTemplate (e.g. the XML file containing the IDTemplate definition) will also be responsible for issuing the representation rules for ID fields using that IDTemplate.

Comparing ID Values

If IDs have different IDTemplates, then they are ordered according to the Name property of their respective IDTemplates (i.e. two ID objects called ID-A and ID-B are ordered according to the ordering of ID-A.IDTagTemplate.Name and ID-B.IDTagTemplate.Name).

If the IDs have the same IDTemplate but are variable-length with different lengths, the shorter one is considered to be "first" in order.

ID values with the same IDTemplate and length are compared (if string) using string comparison; or (if binary) using word-by-word comparison of their (unsigned 32-bit) word values, beginning with the most significant word (index=0).

Lazy Interaction

There are two ways of representing information stored in an object or in a data object. One is explicitly as a field in the data object. The other is implicitly; that is, the data object does not contain the information, but implements a rule or a process by which the information can be calculated from data stored explicitly elsewhere. For example, if storing the area of a rectangle, the area could be computed and stored; or the length and width could be stored and with the area computed, when needed.

A problem can arise with explicit storage, as many quantities require pre-computing, whether or not the quantities are ever needed. These quantities also require storage space in the object. However, explicit storage provides great speed in retrieval. Accordingly, there is a cost when creating the object, but there is a speed when retrieving the information.

Conversely, implicit storage can be problematic, as retrieval is slower. Implicit storage does provide the benefit of avoiding a cost, during object creation, of computing quantities not required. The slow retrieval results from the effort expended, at data retrieval, of calculating the information requested. Further, if retrieving a given data ten times, the data must be calculated ten times.

Lazy interaction provides that if a field is available in an object to store a given data, the calculation is not actually performed until the first time that data is requested. Lazy interaction avoids the expenditure of time necessary to calculate data until there is at least one request, then the given data is stored in a respective field. So, Lazy interaction provides fast creation and fast retrieval.

Lazy interaction has been extended to the present invention for RFID communication. In RFID communication, time on the airwaves can be a scarce resource. Time on the airwaves, as used herein, is communication airtime between readers and tags. Time on the airwaves requires scheduling and management for efficiency; it being undesirable to perform unnecessary communication with a tag. If an application does not require a given data, expending airtime to request that data from a tag is to be avoided, especially considering that this effort might be duplicated for thousands of tags being processed. With some tag technologies, an initial report to a reader might include only a subset of their total information. So, if more information about a tag is desired, additional and sometimes repeated communication with the tag is required.

Lazy interaction provides that the IDTag object model stores fields capable of holding all data needed to describe the tag. A request for a given data is not actually made unless needed by an application. Once requested, the given data is stored in a respective field for later use if repeatedly needed, the motivation being to reduce airtime of communication rather than to reduce processing time.

Design of Data Port Class

An IDTag can have zero or more Control Data Ports and zero or more Memory Data Ports, as defined in the IDTagTemplate. A data port represents a block of data that can be sent (written) to the tag and/or received (read) from the tag. The basic operations on a data port are Read and Write.

A Control Data Port is one that has a special meaning to the hardware, such as special configuration bits in the tag, or a communication channel for bulk data exchange, or a sensor whose value can be read. Reading and writing a Control Data Port frequently causes behavior changes in the tag, or has side effects such as reading a sensor. Use of Control Data Ports is hardware-specific.

A Memory Data Port is available for applications to utilize as a (usually writable) store on the tag. The behavior of the tag is unaffected by reading and writing a Memory Data Port. Use of Memory Data Ports is generic across all types of tag (if they have such memory).

Each data port has a DataPort and a corresponding DataPortTemplate. Most tags have a fixed number of Control and Memory data ports, but some tags have a variable number (IsVariableControlPortCount and IsVariableMemoryPortCount in the IDTagTemplate). If the number is variable, the IDTag itself presents its (current) number of ports in ControlPortCount and MemoryPortCount.

The IDTag has an array of DataPorts for control data ports, and another array for memory data ports. Applications will refer to these ports by their index in the corresponding array. Each port normally has a unique corresponding DataPortTemplate.

Some tags allow a variable number of ports, with a generic description for some or all of them. In the IDTagTemplate, the lower-numbered ports are each described with a unique entry in the ControlPortTemplate or MemoryPortTemplate array (as appropriate). For higher-numbered ports the description is given by the OtherControlPortTemplate or OtherMemoryPortTemplate. In all cases, each DataPort in an IDTag will point to the proper template for that data port.

The DataPortTemplate tells how many (32-bit unsigned) words are in the data port, if the length is fixed (WordCount). In addition, if the port can have a variable length, the DataPortTemplate indicates this with IsVariableLength; in such a case, the DataPort itself tells the current number of words in CurrentWordCount (for some tags this is fixed, for others it can be adjusted by the reader).

Some data ports have fixed characteristics; others can vary from tag to tag. If the characteristics are variable, the reader may have to interact with the tag to determine the characteristics of each data port. The IsDescribed property in the DataPort tells whether the other properties are all known to be valid. If this is false, then the remaining fields may require interaction with the tag before they can be read or written to by the application.

The data port can be read from the physical tag if indicated by the DataPortDescription. If the data port is word-addressable, then the reader will allow ranges of words to be read. The contents of a readable port may be cached in the IDTag model if permitted by the IsCacheable Boolean in the DataPortTemplate; if not permitted, then the value of the data port may vary over time, so an application should not cache the value. (An example would be a data port that corresponds to a sensor input measurement or an available data file.) The DataPortTemplate indicates whether the data port can be read-locked (i.e. set to a state that prohibits reading).

The data port can be written to if indicated by the DataPortTemplate. If the data port is word-addressable, then the reader will allow ranges of words to be written. The DataPortTemplate indicates whether the data port can be write-locked (set to a state that prohibits writing). A Security Key Set may accompany the DataPort, if so indicated in the DataPortTemplate.

Tag-Initiated Reports

Some tags can initiate a transaction with a reader, depending on events on the tag (such as sensor readings, activation of a UI device such as a button, or receipt of external signal such as a proximity beacon). The IDTagTemplate lists such events for a given type of tag, giving a name and description string for each type of event a tag can report.

At this time, the reader's handling of such events is considered hardware-dependent and the data that would accompany such an event is not standardized at all. It is expected that some kind of data object would accompany the report of a tag-initiated event, to describe the details of the event as reported by the tag or determined by the reader.

Design of the Security Key Classes

It is impossible to predict all variations of security algorithms and keys that may be used with IDTags. Therefore, a simple and general model is used for security.

Security is provided by "key sets"—one for the tag, and one for each data port. These represent the program's knowledge about the keys required to interact with the tag. The IDTagTemplate will indicate what keysets and keys are used through the attached SecurityKeySetTemplates.

Each key set consists of an (unordered) array of zero or more keys. Each key has a name and description, and an associated value (represented as a binary array or string using WordString). In the SecurityKeyTemplate, the name is given, along with a WordStringTemplate and an optional default value. There are also bits to indicate whether this key can be written to the tag, and whether it can be write-locked. In the SecurityKey itself, there is a value and (if appropriate) a bit indicating whether this key is write-locked.

In use, when a new ID is discovered, a corresponding IDTag object should be created, and the necessary security keys attached. Whenever the IDTag is passed to a reader operation, the security keys will be available to that operation. The operation can search the key sets in the IDTag to discover the keys it requires (which will be listed in the IDTagTemplate), and utilize the associated values to carry out its task.

For example, a particular type of tag might allow a 96-bit password to be associated with each tag for data encryption. It might be called the "Encryption" key in the tag's key set. The IDTagTemplate would indicate this by an entry named "Encryption" in the TagKeySetTemplate property; this entry would have a WordStringTemplate indicating ExpectedLength equal to 3 (3×32 bits=96 bits). When a new tag is encountered, its encryption password should be looked up according to the enterprise's key management facility, and that value should be placed in a key called "Encryption" in the TagKeySet of the new IDTag. When the IDTag instance is passed to a reader method, the method will search the TagKeySet for a key called "Encryption", and use the associated value in the encryption/decryption algorithm as it communicates with the tag.

Accordingly, in at least one aspect of the invention, possibly implemented in software, information is communicated between a reader device and an application in a tagging system by transmitting a scan instruction to a reader regarding one or more tags, retrieving a template associated with each tag scanned, and transmitting a tag information report to an application, the report including the template associated with each tag scanned so that the application can identify and manipulate elements of tags of differing tag technologies. The template can describe a type of tag scanned, and/or the report can include an object model of the tag having components descriptive of characteristics of the tag, and including the template associated with each tag scanned or including a pointer to a location of the template associated with each tag scanned so that the application can identify and manipulate elements of tags of differing tag technologies.

In other aspects, each template can have a name including a bit string that associates a respective tag type with the template. Or, a template can exist for each type of tag, the template including information about a configuration of each type of tag so that the application can effectively take advantage of features of a respective type of tag. These features provide that the application need only receive a respective template once, the application then being capable of interpreting all subsequent reports directed to a type of tag associated with the respective template.

Another embodiment of the invention includes a data structure having an actual identification field, a temporary identification field, one or more memory fields and at least one security key field, the data structure enabling an application to process various kinds of ID tag technologies. The data structure could further include one or more DataPort fields of either a ControlPort type or a MemoryPort type.

The actual identification field could be binary or a character string, where the actual identification field being viewable as a character string in either case. The actual identification field could be a subclass of WordString that adds a Name string and a Description string. Further, the data structure and each component of the data structure could include a link to a corresponding template.

If the actual identification field of the data structure has different corresponding actual identification field templates, then the respective actual identification field templates can be ordered according to a Name property of the actual identification field templates. Or, if the actual identification field of the data structure is the same as corresponding actual identification field templates, but are variable length with differing lengths, a shorter actual identification field template can be first in order.

Memory fields provide the capability of storing all data necessary to describe an ID tag but an initial scan of the ID tag only populates a subset of the memory fields due to pre-determined scanning time efficiencies. The memory fields unpopulated by the initial scan can be populated upon later request by an application for additional data.

IID TagReporter Interface

This section presents uses and design for an IIDTagReporter interface for middleware, forming a portion of the present invention, that processes ID-bearing labels or tags from a variety of AutoID technologies including bar codes, magnetic stripe cards, SmartCards, RFID tags, 802.11 badges, etc.

While various AutoID technologies differ in many respects, from a data processing standpoint they have a great deal in common. A primary operation of all AutoID technologies is to generate a list of all tags in view of a reader, along with their IDs; other operations involve reading, writing, and/or control functions applied to specific identified tags in view of the reader. In application settings, the different AutoID technologies can sometimes be merged into a single data channel, and processed by a single middleware component.

The IIDTagReporter interface can represent the reader devices from all such AutoID technologies in a single abstraction, suitable for the construction of such technology-agnostic middleware. The present invention captures key features of the scanning of IDs, and provides a generic transport mechanism for implementing more specific functions by applying read, write, and control functions.

Design of IID TagReporter Interface

For Windows Longhorn, the preferred way to define classes is through abstract class definitions rather than interfaces. A key reason is the ease of extension and upgrading by extension. However, MSDN lays out specific criteria under which it may be preferable or necessary to define an interface. One reason is diversity of underlying providers. Another is the need for multiple inheritance, as when implementing components within a framework that has other constraints.

This criteria applies to the tag reporter interface of the present invention. Underlying providers, as described above in the use cases, can be anything from a device to a networked software service. And, in some cases, there are external constraints that a provider must satisfy. For instance, in Chinook, inheritance must be from the Chinook generic service object class. These reasons provide a basis for providing an interface, rather than an abstract class, in the present invention.

Operations supported between ID tags and tag readers are:
Scan—The reader makes a list of the ID tags it can sense. This is actually a comprehensive activity with many possible subparts.
Read/Write DataPort—The reader sends data to a tag and/or receives data back.
Write ID—The reader changes the stored ID value on a tag.
Control Tag—The reader tells a tag to do something.
Lock/Unlock Data—The reader sets or removes a read lock or write lock on a tag element.
Describe Tag—The reader interacts with a tag to determine its characteristics.
Receive Tag Events—The reader receives an unsolicited transmission from a tag.
Deactivate Tag—The tag will no longer respond to readers Issues and variations on these operations are described below.

Design Issues—ID, IDTag, and IDTagDictionary

An ID object model is used to represent a single ID from a single tag. The ID can be in binary or character-string format, and can be fixed-length or variable-length. The IDTag object model represents a single tag.

An IDTagDictionary can be thought of as a hash-table using IDs as the keys and IDTags as the corresponding values. However, it is specialized to recognize that if two IDs come from different series (e.g. different manufacturers) they are distinct, even if they have the same ID value. The chief use of an IDTagDictionary is to use an ID to look up the corresponding IDTag object instance.

If an application wants to store information related to specific tags, a PrivateDictionary is preferably used, supplying the ID fields of the tags as the keys and any desired objects as the values. If IDTags are provided as keys, their ID fields can be used as the underlying keys in the PrivateDictionary. Thus, a PrivateDictionary associates IDs (or IDTags) with arbitrary objects.

An IIDTagReporter provides access to both an IDTagDictionary and an IDTagReportDictionary. The IDTagDictionary can be used to look up an IDTag given an ID, whereas the IDTagReportDictionary is used to look up the latest (current) tag status given either the ID or IDTag.

Scanning Model

Figure 7:
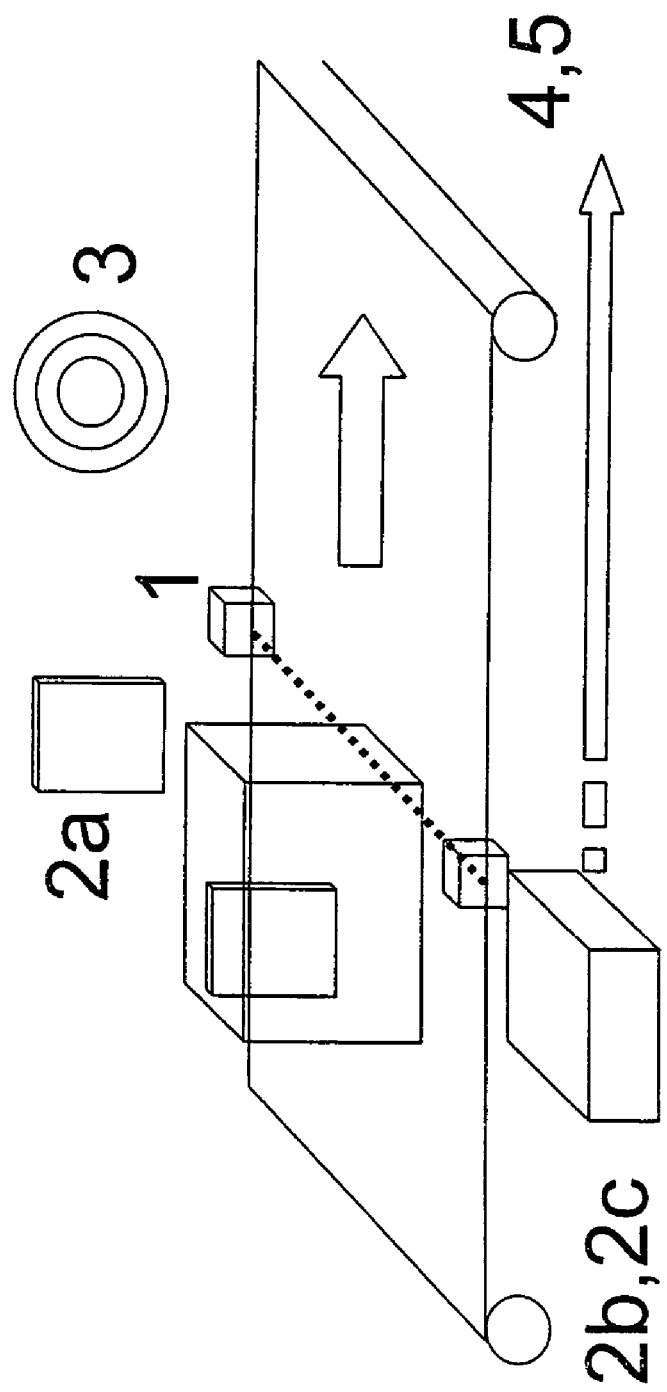
FIG. 7 illustrates scanning activities associated with the present invention, and the elements included in the scanning activities.

Referring to FIG. 7, a fundamental Scanning Activity has any or all of the following elements (where outline numbering corresponds to Figure numbering):
1. An initiator 1 action occurs.
2. The reader initiates one or more scans of the tags in its vicinity using one or more collectors 2a attached to sensors 2c that feed into the reader, accumulating the results into a list. The scans may be filtered 2b/d so that only a subset of the tag responses are included.
3. If the reader has any attachments 3, they may be activated.
4. Any of several housekeeping activities 4 may then take place.
5. A report list is generated and returned via a report event 5.

1. Initiators: A scan can be initiated in response to a number of different occurrences, including:
Immediate operation.
Timer interval.
Particular time on the clock.
* External signal on a specified port and pin.
* External value supplied to a specified port.
* Reader-specific occurrence.
* Tag-specific occurrence (possible with certain types of tag).

The initiators marked with * are considered to be defined by the deployment configuration of the reader (see below); the others are inherently defined for all readers.

2a. Collectors: A collector might be, for example, a particular antenna attached to a multi-antenna RFID device. For most readers, there is a single collector.

2b. Scan Filters (hardware): In some technologies, a filter can be broadcast to the tags in the vicinity of the reader before a scan; then, only the tags that match the filter will respond to the scan. Match criteria might include a boolean combination of primitives; for example: (1) ID or memory contents within a specified range; or (2) ID or memory contents in which specified bits match a specified pattern. Clearly, most tag varieties will support a very limited subset of these criteria. Note that if tags use Alias IDs (see below), the ability to filter based on ID may be quite limited; also, if tags encrypt their data, then filtering might require that an appropriate key be supplied to the tag.

2c. Sensors: Some readers have more than one sensor. In a scan activity description, a sequence of collector/sensor pairs can be specified, along with an indicator of whether it is desired that these combinations be invoked sequentially or simultaneously. Most readers will be able to implement a very limited subset of this full capability.

2d. Scan Filters (software): If a reader cannot implement scan filters in hardware, it is likely that a full scan will be performed and desired tags selected through application of the indicated filter in software. A reader with a limited hardware filter capability could actually implement more comprehensive filters using a combination of hardware and software filtering.

3. Attachments: Some readers may have external devices that can be activated, such as making a beep when a scan occurs. Such attachments can be specified as part of a scan activity.

4. Housekeeping Activities: The reader may be asked to perform any or all of several tasks before generating a report. These tasks include:

a. Alias ID Resolution. In some technologies, tags do not return their real IDs to a scan command. Instead, they generate a new random number, called an Alias ID, or temporary identification, for each scan. For those technologies that have a real ID as well, the reader can "resolve" the alias ID to a real ID by sending security keys (such as an unlocking password and encryption key) to the tag in order to receive back the real ID. In a scan activity, the reader may be instructed to perform Alias ID resolution automatically for every Alias ID received. (Note 1: In some technologies, automatic resolution is always required, and the reader must store the correspondences between real and alias IDs for later use.) (Note 2: If automatic resolution is not performed, the tags's real IDs are not known until the application has received the tag report and made specific request for the reader to resolve specific alias IDs.) Generally, applications will want to specify automatic Alias ID resolution in the scan activity. Alias ID resolution is described in more detail below.

b. IDTag Lookup. In most cases, the application will not want the ID returned directly; instead, the reader should keep an IDDictionary of IDTag objects, and look up the IDTag for each ID that is scanned. This lookup will generally be required if Authentication and/or Description are specified (see following paragraphs). The reader will need to keep an internal IDDictionary for this purpose. Filters may choose to use the same IDDictionary as their underlying providers; for this reason, each IIDTagReporter object also implements the IIDDictionary interface to expose its internal IDDictionary. If automatic lookup is not specified in the scan activity, then the reader must create a new IDTag object for each ID it scans, in order to generate the subsequent report. Note that if Alias IDs are supplied by a tag, but automatic resolution is not specified, then IDTag lookup is impossible and the reader must create a new IDTag object for each Alias ID it receives during the scan.

c. Authentication of Tag ID. Some tags may provide anti-counterfeiting capability by implementing some kind of authentication. Usually, this requires some algorithmic interaction with the reader involving one or more security keys on the reader as well as keys stored on the tag, and possibly some other criteria that are hard to duplicate (such as minute variations in the structure of the radio antenna on an RFID tag, or minute variations in the filter arrangement of a bar code label). Authentication may be required by the scan activity description; tags that fail should generate an exception, and their IDs should be considered unreliable. An authenticating reader is specialized; not all readers will have this capability.

d. Tag Description. As previously described, scanned tags may have configuration parameters that are unknown until further reader/tag interaction takes place. This interaction is called Description in the IDTag SDK. An application is not permitted to access fields of the IDTag object other than the ID itself, until the tag is described and asserts the IsDescribed property. An application can indicate in the scan activity specification that all tags scanned are to be fully described before the tag report is generated. (If IDTag Lookup is also specified above, then a tag need only be described the first time it is scanned.) Note that each memory port may similarly require tag interaction to discover a complete description—if automatic description is specified in the scan activity, then it includes description of the tag as well as description of each memory port, before the report is generated.

e. Checktag Recognition. "Checktags" are specific tags used for specific purposes, primarily: (1) to signal to a reader to enter a diagnostic mode; (2) to signal a mobile reader that it is at a specific location; or (3) to be scanned always by an antenna, so that its absence from a scan indicates a hardware malfunction. As part of a scan activity, checktags may be specified; if a checktag is discovered in the scan (or not discovered, as indicated), then a separate report is generated via a distinctive reader event (OnCheckTagReportEvent rather than OnReportEvent).

5. Report Generation: A TagReport is generated for each tag ID discovered in the scan, and these are collected into a TagReport, described further below. The TagReport is returned via an OnReportEvent event.

A Scanning Activity may also specify that after each scan, scanning is to be suspended, SuspendScanning( ). If specified, then the application's OnReportHandler should issue ResumeScanning( ) to tell the reader to resume scanning activities. This can be useful, for example, when Alias IDs are in use, and tag I/O may be required before the next scan is initiated (at which point all the Alias IDs would be randomized again).

Specification of Scan Activities. A ScanActivity object specifies a scan activity, including all of the parameters needed to control and implement elements 1-5, above. Each ScanActivity has a name, which is preferably inserted in the Originator property of each IDTagReport.

When a scan is performed, an array of ScanActivity objects is provided. The reader shall then perform all of these activities simultaneously. (Most readers can only implement one activity at a time, but some might be able to have several initiators active, with a distinct ScanActivity for each initiator). If Scan( ) is invoked without a list, the reader's DefaultScanActivity property supplies the list of scan activities to perform.

Regardless of the source of the list of scan activities, a copy of that list will be placed into the reader's CurrentScanActivity property by the Scan( ) method. A Scan( ) method call with an empty list (array of 0 elements) instructs the reader to stop scanning and clears the current scan activity specification. This is different from the SuspendScanning( ) and ResumeScanning( ) methods, which cause a temporary halt but do not change the scan activity specification.

Regarding item 4a in further detail, Alias IDs and Alias ID Resolution, note that the Alias ID mechanism was incorporated by EPC Global into new GEN2 tags. Alias ID changes the way a reader interacts with a tag, and also changes the way a server interacts with the reader.

Alias ID provides that a tag may have a password that is required from a reader before the tag will reveal information to that reader. This, however, creates a problem: how does a reader know that there is a tag in its vicinity, since the tag will not provide information until it receives a password? The resolution is that every time a reader requests a scan or tag response, each tag generates a random number (the Alias ID or temporary identification). The random number becomes a pseudonym for the tag for use until the next scan, at which time the tag generates a new random number. Therefore, the Alias ID is a temporary, or limited lifetime, name. During this interval or lifetime, the reader may address the tag by the Alias ID, present credentials in the form of the password, and request that the tag begin further communication, including revealing its true ID number, or permanent identification, along with other information.

Accordingly, Alias IDs provide privacy and security, by preventing an offering of information to any reader request. With Alias ID, a reader must offer a password to the tag before receiving the desired information.

Without Alias IDs, the basic duty cycle of a reader would be, for instance, to perform a tag scan, receive responses, including identification numbers, effectively serialized through anti-collision mechanisms, report the responses to a respective application, and scan again. If a specific read/write request was desired for an individual tag, the system would wait until the scan is complete, and upon receiving such notice, software would instruct the reader to perform the specific operation prior to performing the next scan.

With Alias ID a more complicated protocol is needed because what the reader receives from the tags is a set of random numbers not applicable to the performance of business functions. For applicability, each Alias ID, or temporary ID, must be resolved to the actual or permanent ID of the corresponding tag, which are meaningful to the application. That protocol is referred herein to Alias ID Resolution. In short, a reader addresses a specific tag using its Alias ID, presents its credentials, asks for the actual ID, and receives the actual ID.

The present invention provides the following mechanisms for incorporating Alias ID Resolution into software for application communication with the reader. First, software can request that a reader, every time it performs a scan, perform resolution on every alias ID received prior to returning a report to the application, referred to herein as "Resolve On Scan." Accordingly, the reader will perform a scan, receive Alias IDs, perform resolution on each, in turn, and, only when all resolutions are complete, send a report to the application which may or may not trigger business activity in the application. The reader is then free to perform another scan. Second, where time is of the essence, or where the application has an external way of knowing which tags are interesting and desirable, the application can instruct the reader, through the IIDTagReporter Interface of the present invention, not to perform Alias ID resolution on every tag, but rather create a temporary tag object for each Alias ID received by the reader. Temporary tag objects could then be reported to the application. The application can then request Alias ID resolution on only those tags of interest. This mechanism is referred to herein as "Resolve On Demand."

Also, the Suspend Scanning aspect of the present invention corresponds to Alias ID resolution. The application may instruct the reader that, after it performs a scan, and associated steps 1 through 5, the reader will suspend operation and not immediately issue a new scan until receiving a specific instruction from the application. This prevents an undesirable regeneration of new Alias IDs, at which time it may be impossible for the reader to implement a subsequent instruction by the application to read, write or control a specific tag. With Suspend Scanning, the application can instruct the reader to pause, providing the application time to determine whether further tag interaction is desirable before a new scan resets all of the Alias IDs to new values.

Accordingly, in at least one aspect of the invention, possibly implemented in software, tag identifications are resolved by performing a scan of one or more tags, receiving temporary identification information for each of the tags, selectively ordering the temporary identification information, and resolving the temporary identification information to permanent identification information for each tag in the order selected prior to performing another scan. Or, after receiving the temporary identification, a temporary tag object could be created for each temporary identification information received, the temporary tag objects could be reported, a request could then be received for resolution of one or more temporary tag objects in a selected order, and the temporary tag objects would then be resolved to permanent identification information for each tag in the selected order.

This activity could be entirely performed prior to performing another scan. The temporary identification information could be a random character string. A further scan could then occur, perhaps upon receipt of instructions from an application, and temporary identification information for each tag would be reset and re-populated with a random character string. Or, during the process above, an instruction could be received to suspend further scanning pending further instruction, allowing interaction with the one or more tags prior to a resetting of the temporary identification information upon a further scan.

Other aspects of the invention, possibly implemented in software, include managing ID tag scanning and reporting by initiating a scan of one or more tags, instructing a collection of ID signals transmitted as a result of information gathered during the scan, the ID signals including a tag identifier for each tag, and generating and forwarding a scan report to an application. Any one or more of the following activities could also be performed, either prior to, during, or after generating the scan report:

where the tag identifier is a temporary tag identifier, resolving the temporary tag identifier for each tag to a permanent tag identifier;

looking up an actual object model for each tag using the tag identifier;

authenticating each tag;

gathering and storing all descriptive information available for each tag; and recognizing any checktags and generating an associated alert; and generating and forwarding a scan report to an application.

Resolving the temporary tag identifier to a permanent tag identifier could be required before performance of any subsequent step. This resolution could involve the forwarding of a security key to the respective tag to receive the permanent tag identifier. Looking up the actual object model for each tag using the tag identifier could be performed in the application or the reader.

Checktags can be a list of one or more tag identifications generated by the application and forwarded to a reader with instruction that if any of the tag identifications are (or are not) recognized during a scan a special alert is to be forwarded to the application and the respective tag identification is, or is not, to be included in the scan report to the application. At any time in the process, a suspension of further scanning instruction could be implemented, allowing interaction with one or more tags prior to a resetting of temporary identification information upon the next scan. Trigger conditions could be set to initiate any one or all of the scan activities.

Another aspect of the invention is a data structure having one or more quality-of-service fields describing importance parameters to a tag reader of a quality of pre-determined activities relative to speed of completion of the activity. The parameters could govern any one or more of:

elimination of false negatives (missed tags) in scan operations;

elimination of false positives (ghosts) in scan operations;

confidence that read operations have succeeded;

confidence that write operations have succeeded;

confidence that a tag is authentic (not counterfeit);

maximum packing of data into an available user-memory on a tag;

maximum range for communicating with tags;

number of tags in communication range of a tag reader; and precision of location information of a tag.

Lastly, the importance parameters could have values such as less important than speed, as important as speed, more important than speed and most critical.

Reports: IDTagReportList

A report generated by a scan is an IDTagReportList object. IDTagReportLists are designed to run fast for sequential processing, as in this scenario:

A. A component (such as a filter) maintains an ArrayList of all the IDTags it believes to be in range of the reader. This list is sorted by increasing ID.

B. A scan is performed, and the reader returns a new IDTagReportList of the tags just scanned. When this list is received, it is then sorted by increasing ID value (if not already sorted).

C. Now the ArrayList and the IDTagReportList are compared in order of increasing ID, while creating a new ArrayList of tags believed to be in view of the reader. Newly arrived tags are easily noted, as well as departing tags (known tags that were not included in the IDTagReportList) and tags seen again (present in both the ArrayList and the IDTagReportList).
Each IDTagReport has the following properties:
IDTag object
Timestamp (the time at the start of the scan)
Condition (the type of entry being reported, such as "observed" or "departed")
Originator or the entry (typically the name property of the ScanActivity)
Location associated with the entry (if any)
Extra, reader-specific "associated data"

It may be preferable for an application to know which, if any, of the properties listed above are the same for all entries in the IDTagReport. For example, a filter might be written with the assumption that a single report contains all entries from a single originator and timestamp. For this reason, as entries are recorded into the IDTagReport, they are examined to see if they all have the same value for each property. If so, the common value of the property is made available in the IDTagReport object itself, so that the application can assume that all entries have the same value for this property. If the IDTagReport is serialized, it will be unnecessary to include these repetitive property values for each entry.

Location and Source Determination

Tag reports of the present invention include separate fields for location and source, integrating all sources of location through RFID.

The present invention contemplates at least seven approaches for deriving location information from a tag reading, and each are incorporated into the object model herein. The hardware technologies involved with the approaches are quite different, and the software may differ depending on whether or not servers are involved, etc. However, in the IIDTagReporter interface, all are unified into one object model. Accordingly, the present invention provides that software applications can be written that use location information regardless of which approach is used by the hardware to derive the location information.

Figure 8:
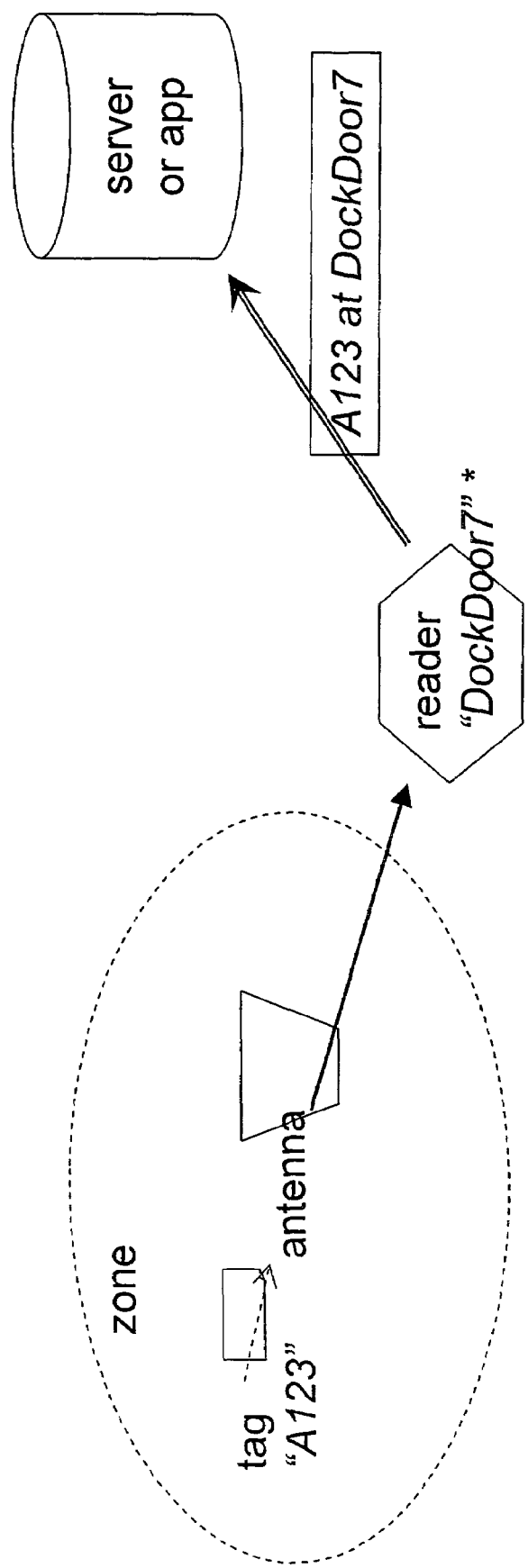
FIG. 8 illustrates one of many approaches associated with the present invention for deriving location information from an IDTag reading, the approach of FIG. 8 assigning a name or ID to each reader.

Referring to FIG. 8, a first approach assigns a name, or ID, to each reader. The ID or name of the reader is used as the location. For example, reader number #1234 may be assigned to a dock door, which is referred to as dock door A. Reader number #1234 could be used as a location. Accordingly, receiving a tag reading stating that the tag came from reader #1234 would reflect a different location than a report from a tag stating that it came from reader #5678. A variation would be to assign a name the antenna. Another variation to this approach is to assign place names, like dock door A, dock door B, dock door C, and providing a means to translate from the reader or antenna ID# the name of the place to which that reader or antenna is located. The business logic in the application could be based on either the reader ID# or the place name, but probably more convenient to use the place name in the business software, since it is one level removed from the actual reader ID#. Either way, this is the most common approach used today, and the approach included in the specification for EPCglobal, where it is specified that tag reports have one field, referred to as "sort," indicating where the report came from. The present invention provides two fields. One field is for source, that is, where the report originated, meaning the device or device component that originated the report. The second field for location, corresponding to where the tag is believed to be. In simple systems, both fields may have the same value. However, separate fields with different values provide advantages in many technologies.

Figure 9:
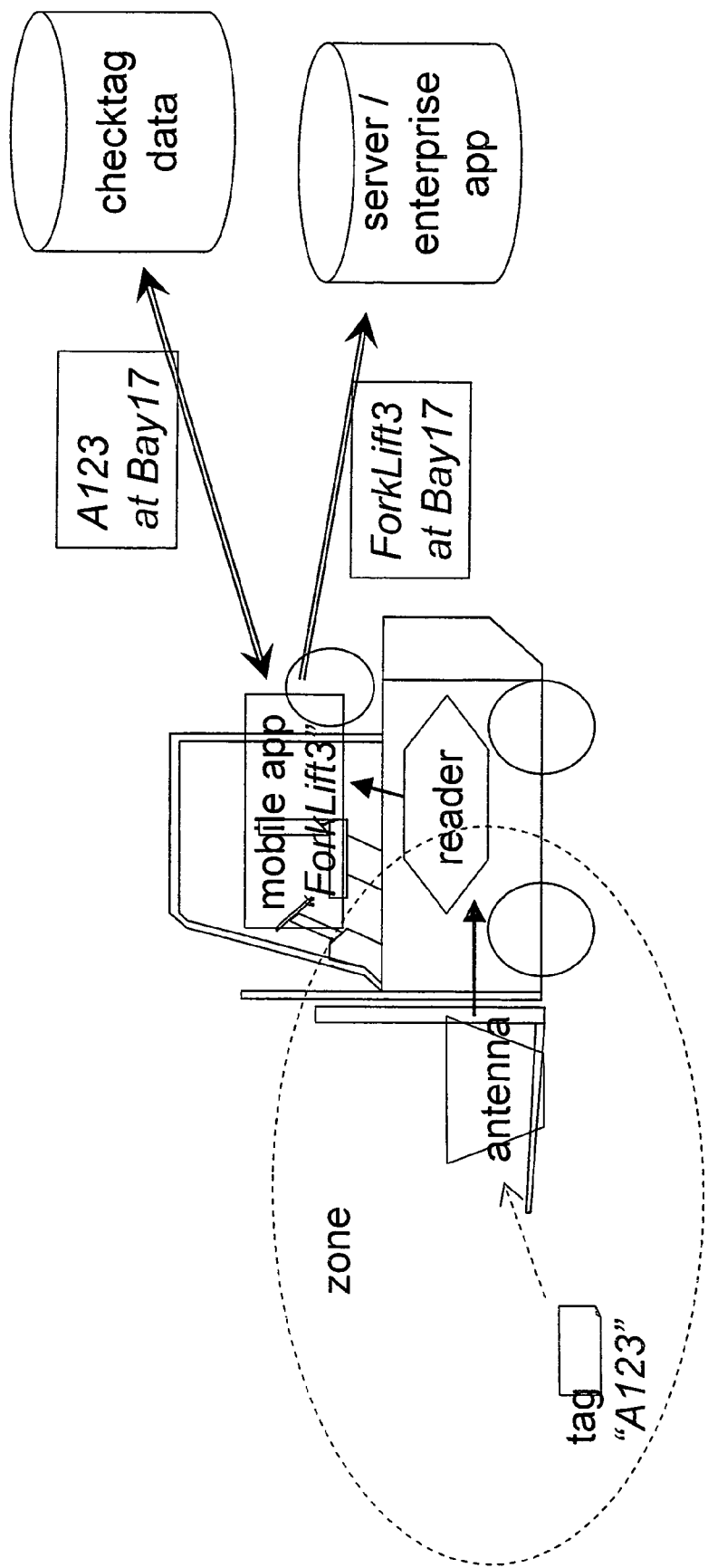
FIG. 9 illustrates another approach for deriving location information from an IDTag reading, the approach of FIG. 9 using location checktags to distinguish tags at known locations.

Referring to FIG. 9, a second approach uses location checktags, as described above. In this approach, a reader, when reading a tag, associates that tag, or tag ID#, with a given location, using the tag's ID#, or associated data retrieved using the tag ID, as the identity of the location. In this approach, the source of the reading is actually the reader, but the location is the location at which that tag exists. In this approach, the source and the location fields would be different. This approach is primarily directed to mobile readers.

Figure 10:
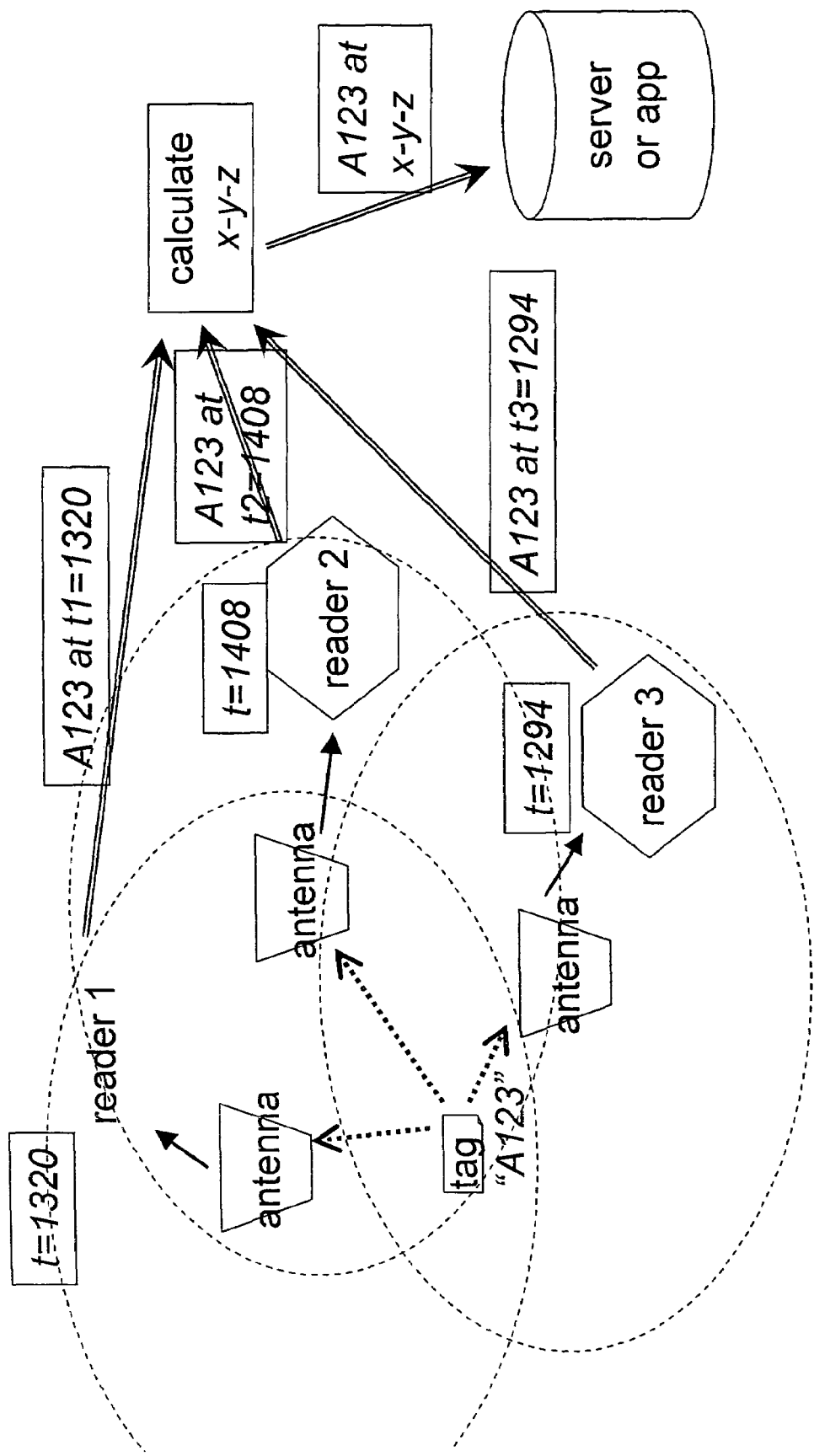
FIG. 10 illustrates another approach for deriving location information using Trilateration.

Referring to FIG. 10, a third approach adopts Trilateration, where multiple readers or antennas read a given tag at the same time, or in a way that is synchronized over time. And each of the multiple readers independently determines how far away the tag is from the respective reader. This distance could be in absolute terms or in relative terms, relative to some arbitrary scale or to a scale in conjunction with the other readers. The location of the tag could thereby be determined in the space spanned by the receiving zones of all the readers. There may be calculations performed externally, or performed on a reader, or on a server, where raw measurement data from the readers is turned into a location determination. In the example illustrated in FIG. 10, the source of the data would be the server and not any specific device.

Two implementations of Trilateration are time of flight and signal strength. Time of flight is the difference between the times of signal travel from each of the multiple antennas. Time techniques involve determining a time synchronization across the readers, which can be difficult to establish. Signal strength methods are affected not only by distance, but also by any intervening objects or materials through which the signal must pass.

Figure 11:
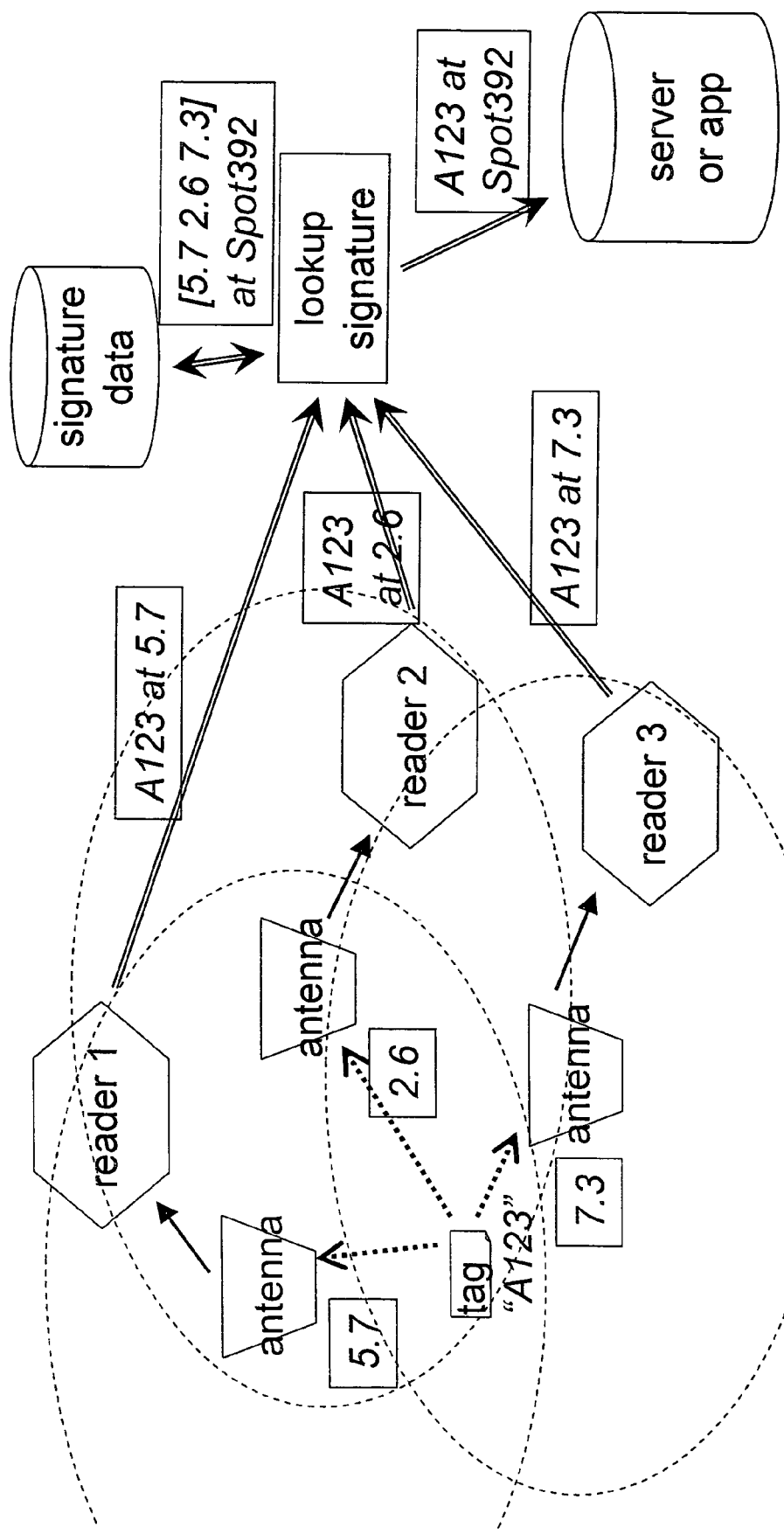
FIG. 11 illustrates another approach for deriving location information using signal strength signature, where signal strength is measured by several readers, and a look up process is implemented rather than a calculation process.

Referring to FIG. 11, a fourth approach is Signal Strength Signature, where signal strength is measured by several readers, and a look up process is implemented rather than a calculation process. With Signal Strength Signature, each reader does attempt to determine how far away the tag is, rather a signal strength is provided with each tag observed. The look up is established through a survey performed in the field, determining and recording signal strengths at different locations, then storing the signal strengths in a table for look up as needed.

Figure 12:
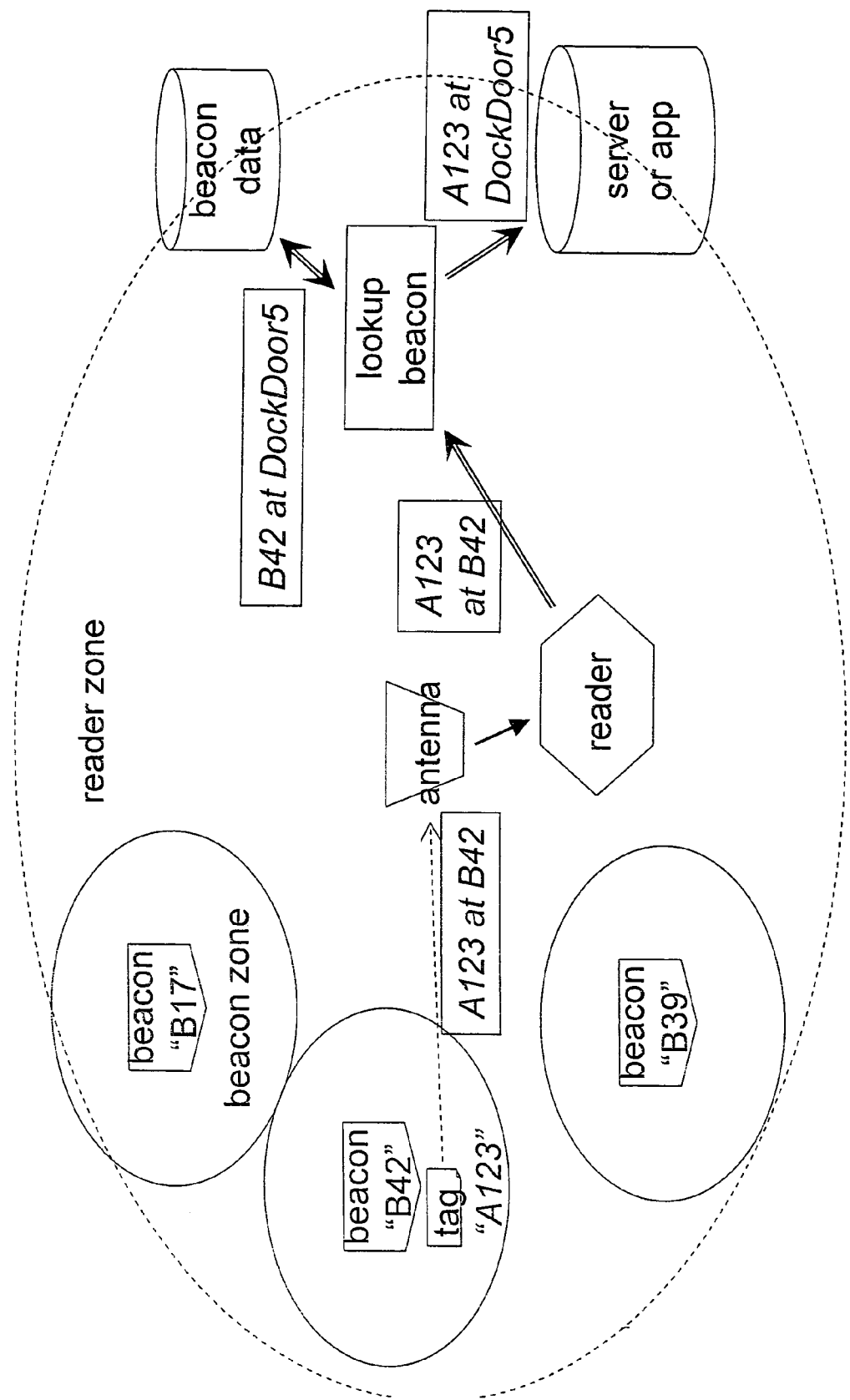
FIG. 12 illustrates still another approach associated with the present invention for deriving location information, implementing a beacon that broadcasts identification information to readers.

Referring to FIG. 12, a fifth approach incorporates another hardware element, called a beacon. Beacons typically broadcast an ID# over a short range, and are usually inexpensive. In this approach, a beacon is positioned at any location of interest. When a tag enters the zone of the beacon, the tag receives a broadcast including the beacon ID#. The tag then reports the beacon ID#, and its own ID#, over a longer range of communication to a central antenna. That information can be is stored in a server for later look up, and can be reported to the application.

Figure 13:
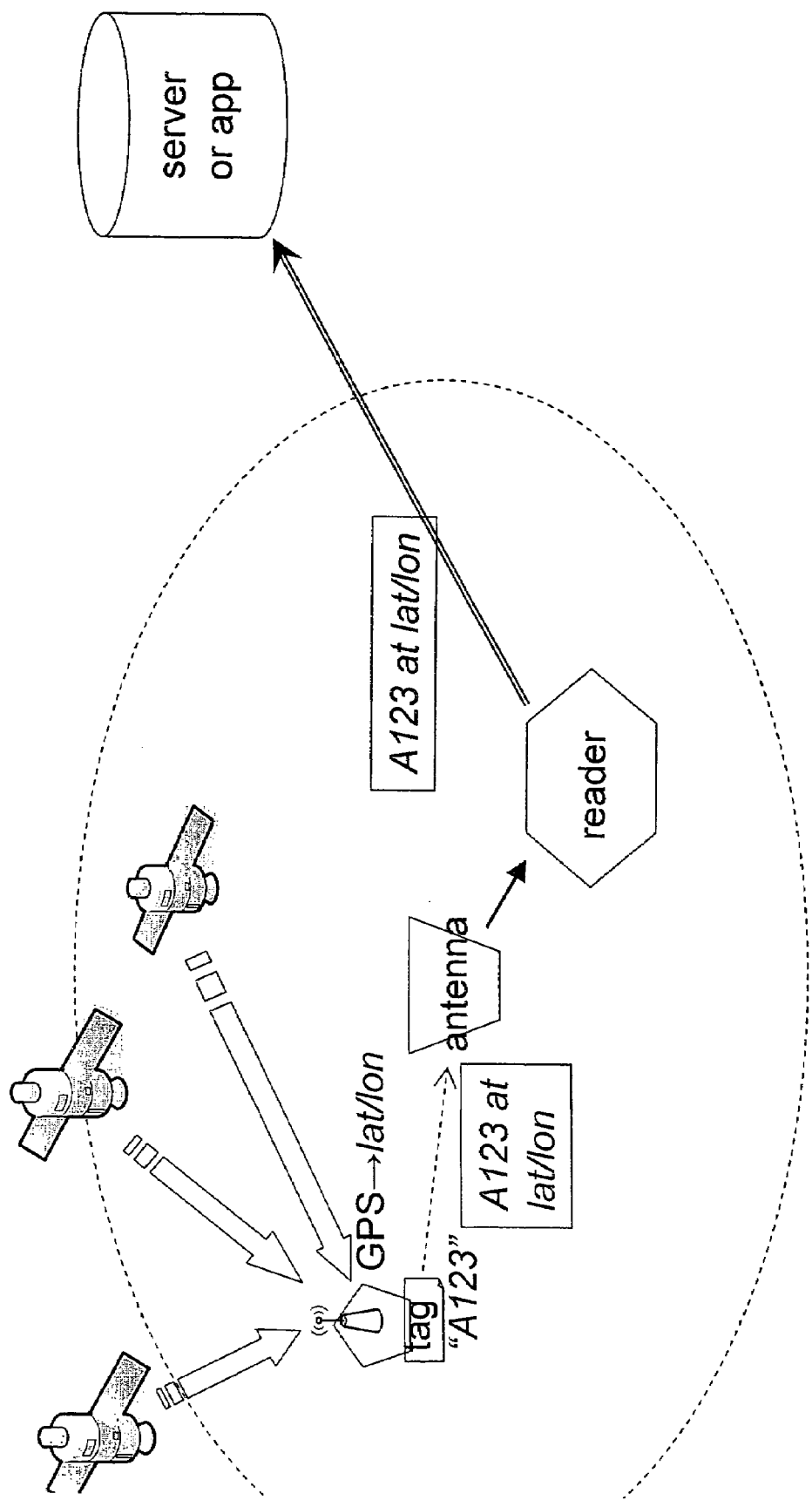
FIG. 13 implements tags with location sensors for deriving location information, where a tag may be used for telemetry, and RFID is a carrier of sensor data to a reader and an application.

Referring to FIG. 13, a sixth approach implements tags with location sensors, where a tag may be used for telemetry, and RFID is a carrier of sensor data ID# to a reader and application.

Figure 14:
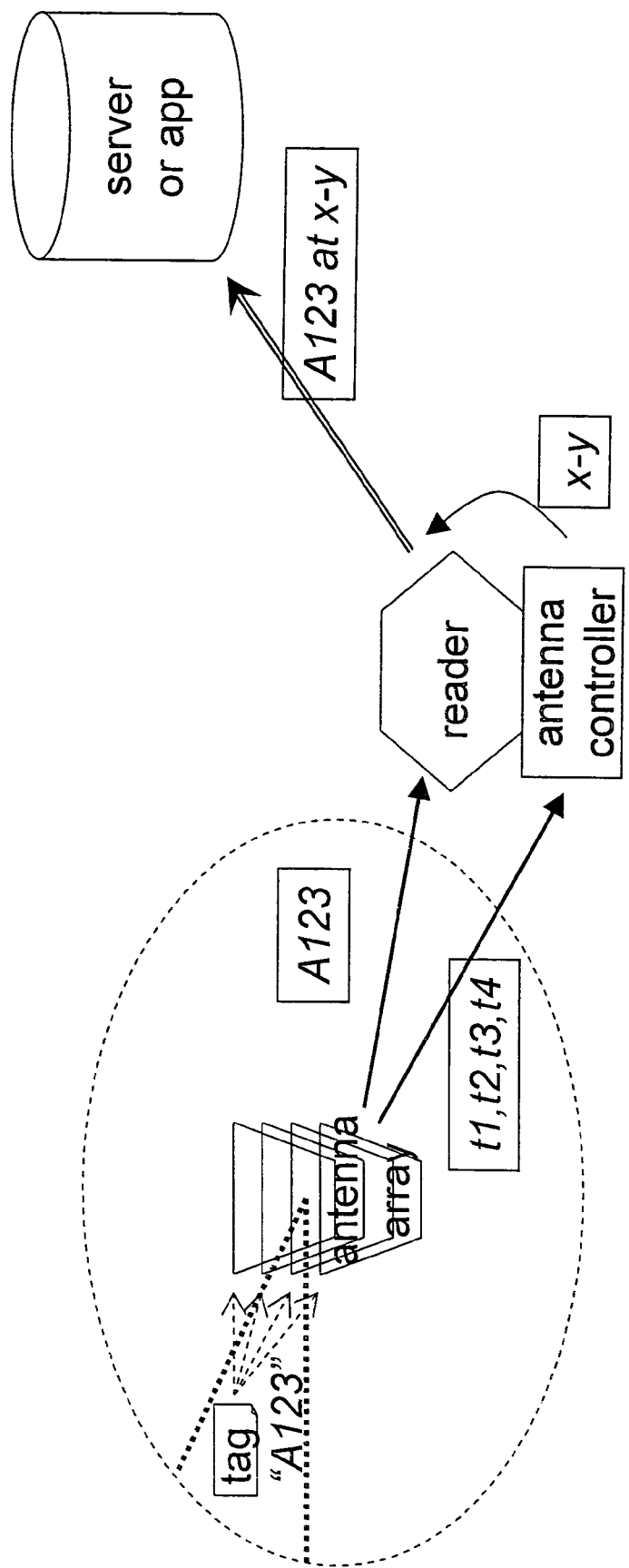
FIG. 14 implements a specialized antenna, or collection of antennas, to implement differential times of flight techniques to determine the location of a tag.

Referring to FIG. 14, a seventh approach uses a specialized antenna, or collection of antennas, to implement differential times of flight techniques to record the minute differences in the time of arrival at the various antennas, thereby determining the location of the tag.

Table 1 provides a summary of the approaches, what each reports, and what assumptions are made about the tags and the readers.

TABLE 1

Summary of Techniques

|  | Tag | Reader | Location |
|---|---|---|---|
| Reader ID | Any | Any | Reader ID |
| Tag ID | Any | Any | Tag ID |
| Trilateration | Active | Special | x-y-z |
| Signature | Active | Special | Spot ID |
| Beacon | Special | Special | Beacon ID |
| Sensor | Sensor | Special | Any, e.g. x-y-z |
| Ph. Array | Any | Any* | x-y-z |

The present invention unifies all seven approaches by separating a source field from a location field. "Source" indicates how to contact a tag for further interaction; and "Location" informs where the tag is using universal location schema. Table 2 illustrates information placed into a source field and a location field to accommodate each of the approaches.

TABLE 2

Location Reporting in IDTag SDK

|  | Source | Location |
|---|---|---|
| Reader ID | Reader ID | Reader Location |
| Tag ID | Tag ID | Tag Location |
| Trilateration | Calculation Server | Calculated x-y-z |
| Signature | Lookup Server | Spot Location |
| Beacon | Lookup Server | Beacon Location |
| Sensor | Reader ID | Reported Location |
| Ph. Array | Reader ID | Calculated x-y-z |

Note that Location could be indicated universally across the different approaches, requiring a unique location description. An example is Microsoft's WinFS, where Location is a collection of LocationElements, subclassed as coordinates (+uncertainty +coordinate system); entity ID (+database +database type)(including the case of a list of names used as locations); street/postal address; and electronic endpoint (IP address, etc.). LocationReport, as part of WinFS also has metadata about the source, time, etc.

Accordingly, in at least one aspect of the invention, possibly implemented in software, tag location information is derived from a tag reading by performing a scan of one or more tags, and generating a tag identifier for each tag scanned, the tag identifier including a source field and a location field so that location can be derived regardless of a tag location technology employed.

The source field can provide information pertinent to contacting each tag for further interaction and/or identify a hardware component from which delivery of the respective tag identifier originated. Examples of the hardware component could be Reader ID, Tag ID, a Calculation Server, or a Lookup Server.

The location field could identify respective tag locations using universal location schema and/or could identify where the respective tag is physically located. The physical location of the respective tag could be identified by Reader location, Tag Location, Calculated x-y-z, Spot Location, Beacon Location, or Reported Location. Moreover, the source field and the location field include identical values. The Tag location technology employed could be Reader ID, Tag ID, Trilateration, Signature, Beacon, Sensor or Phased-Array, among others.

Another aspect of the invention is a data structure for deriving tag location information from a tag reading, and includes a tag identifier including a source field and a location field, providing that location can be derived regardless of a tag location technology employed during the tag reading. The source field and location field retaining information as articulated above.

Description and Deployment of the Reader

The properties of the reader are broken into two parts, reflecting the fundamental hardware, and the way the hardware may be set up for use ("deployment").

The hardware is described in a ReporterDescription object. ReporterDescription includes:

Name and Description of the reader

Version (a string that should encode the version information for hardware, firmware, and software)

A list of the names of the communication protocols that the hardware can implement A list of the TagTemplates for the tags that the reader can recognize, where a filter inherits the TagTemplate list from an underlying provider.

An indication of the features the reader supports

Pass-thrus for reader properties, methods, and alerts

Distinct from the hardware is the way that a reader may be configured, which can depend on how it is intended to be used. This is described in a ReaderDeployment object (the reader's current configuration is recorded in its CurrentDeployment property). ReaderDeployment includes:

A list of which types of initiator the reader can support

A description of the initiator ports on the reader

The set of deployment initiators available in the current configuration (ports with pin signals, ports that supply values, provider-specific initiators, and tag-generated initiatiators)

Lists of the collectors, sensors, and attachments available for scan activities.

A list of the possible condition names that the reader can report.

In an enterprise setting, the deployment configuration of the reader would be obtained from some stored configuration specification (such as a file containing a serialized ReaderDeployment object).

Reader Protocols and Tag Descriptions

Some readers may support multiple radio protocols, either one at a time or in certain allowed combinations. Similarly, some readers may be capable of recognizing several types of tags.

Specifying all of the hardware characteristics implied by each protocol is not possible. Therefore, in IIDTagReporter, each protocol is simply denoted by a character string that may be meaningful to the reader.

Each type of tag is described in an IDTagDescription object, as described under IDTag Object Model, above. It is expected that a reader might, for example, read XML files for all of its attendant tag types when it begins operation. Each IDTagDescription lists one or more protocols under which that type of tags can be recognized.

A caller can ask an IIDTagReporter to give a list of all supported protocols, or all supported tag types. The caller can specify a set of protocols the IIDTagReporter should enable itself to simultaneously utilize (if possible), and the caller can ask what set of tag types can be recognized with the current set of enabled protocols.

Other Reader Properties and Methods

The IIDTagReporter interface can also include:

An exception event handler

Pass-thrus for reader-specific properties, methods, and events

IIDTagReporters can perform the following tag interaction operations:

Write and/or write-lock the ID field

Resolve an Alias ID (if not resolved automatically in the scan activity)

Obtain a complete description of the tag

Deactivate the tag

Obtain a complete description of a data port

Read a data port or part of a data port (if word-addressable)

Write to a data port or part of a data port (if word-addressable)

Write-lock a data port or part of a data port (if word-addressable)

Set security keys for the tag or for a specific data port

Perform a tag-specific operation

IIDTagReporters can also implement the following functions:

Verify that the reader can perform a candidate set of scan activities

Verify that a candidate tag-specific operation can be carried out

Restore the factory settings to the reader

Reboot the reader

Suspend, Resume, and Clear operations (see Asynchronous Operation below)

Asynchronous Operation

In general, IIDTagReporters support both synchronous and asynchronous operation. Scanning is inherently asynchronous; and is therefore not the focus of this section.

The methods of IIDTagReporter (other than Scan) are preferably written in synchronous form—a call on a method will block until the action is completed and a value can be returned if appropriate.

For asynchronous operation, the standard pattern can be used. In summary, the caller creates a delegate whose signature matches the desired method; assigns the method to that delegate; then executes the BeginInvoke method that Visual Studio automatically defines for every delegate. BeginInvoke creates a new thread to execute the method. The original thread returns immediately to the caller and provides an AsyncResult object; the new thread executes the method in a synchronous way (blocking to wait for I/O activities). The original thread can poll the AsyncResult object or block until it completes (using WaitOne); then EndInvoke can be used to retrieve the result returned by the method.

If a caller invokes several asynchronous operations, the new threads will chase each other down the stack of filters. Therefore, all implementations of IIDTagReporter are required to be thread-safe. If an IIDTagReporter covers a single-use device (such as a network client or a physical sensor), then all incoming method calls should be made sequential using normal means (such as a Monitor on a lock object; see numerous MSDN articles on the subject).

IIDTagReporter also specifies the operations of SuspendAllOperations( ), ResumeAllOperations( ), and ClearPendingOperations( ); these can be implemented as follows:

SuspendAllOperations( )—when the current operation (if any) is finished, the governing Monitor should not be released automatically. This might require an additional Monitor lock object for implementation. Also, scan activities should not be initiated.

ResumeAllOperations( )—the current operation (if any) can release the governing Monitor normally. Scanning activities may be initiated again.

ClearPendingOperations( )—all operations that are waiting for the locked Monitor should be cancelled and should immediately return indicating failure due to cancellation. Implementing this probably requires an additional locked "cancel" boolean.

Security Model

A single specific security model for all ID tag technologies is not feasible. Instead, the present invention provides "security keys" including a name and value, which can be collected into sets. The keys for tags are maintained in the IDTag model; where a method is provided to write and/or write-lock security keys on the tag.

The IIDTagReporter is equipped with a set of keys to use in carrying out its functions. In addition, a set of "default tag keys" is specified—these keys can be passed on to newly created IDTag objects during a scan activity. The use of all these keys is hardware-specific.

QOS Tuning Model

IIDTagReporter provides a simplified model for tuning the quality-of-service parameters of the provider. The present invention provides a number of parameters, and each can be traded off against speed. The parameters govern:

Elimination of false negatives (missed tags) in scan operations.

Elimination of false positives (ghosts) in scan operations.

Confidence that read operations have succeeded.

Confidence that write operations have succeeded.

Confidence that a tag is authentic (not counterfeit).

Maximum packing of data into the available user-memory on the tag.

Maximum range for communicating with tags.

Number of tags in communication range.

Precision of location information

Each parameter has one of the following values: LessImportantThanSpeed, AsImportantAsSpeed, MoreImportantThanSpeed, MostCritical. Only one parameter can have the value "MostCritical" at any time; if there is a MostCritical parameter and a different one is set to MostCritical, then the first is degraded to MoreImportantThanSpeed. The default value of all parameters is LessImportantThanSpeed.

The interpretation of these parameters is entirely up to the provider. For example, the default Write operation might try a single write; if AsImportantAsSpeed, then it might write and then verify; if MoreImportantThanSpeed, it might try several cycles of write-and-verify; and if MostCritical, it might try many cycles before reporting failure.

The IIDTagReportFilter Interface

A report filter is an object class that calls one or more IIDTagReporter objects as underlying providers, and in turn exposes the IIDTagReportFilter interface (i.e. is a provider for IIDTagReportFilter). IIDTagReportFilter extends IIDTagReporter, which means that a filter can in turn be used as a provider to another higher-level filter or application.

IIDTagReportFilter uses an array of IIDTagReporter objects to keep track of the topmost implementor for each property, method, and event in the interface. This is used to implement drop-thrus for elements that are not implemented in the current IIDTagReportFilter. In the constructor, a filter should make a copy of its provider's list; and set all the entries that correspond to elements implemented in this filter to "this".

If an IIDTagReportFilter contains an internal IDTagDictionary and/or IDTagReportDictionary, then they are exposed to the caller. However, if it does not, then it exposes the IDTagDictionary and IDTagReportDictionary of its underlying provider.

Virtual Reader Design (Filters)

Figure 15:
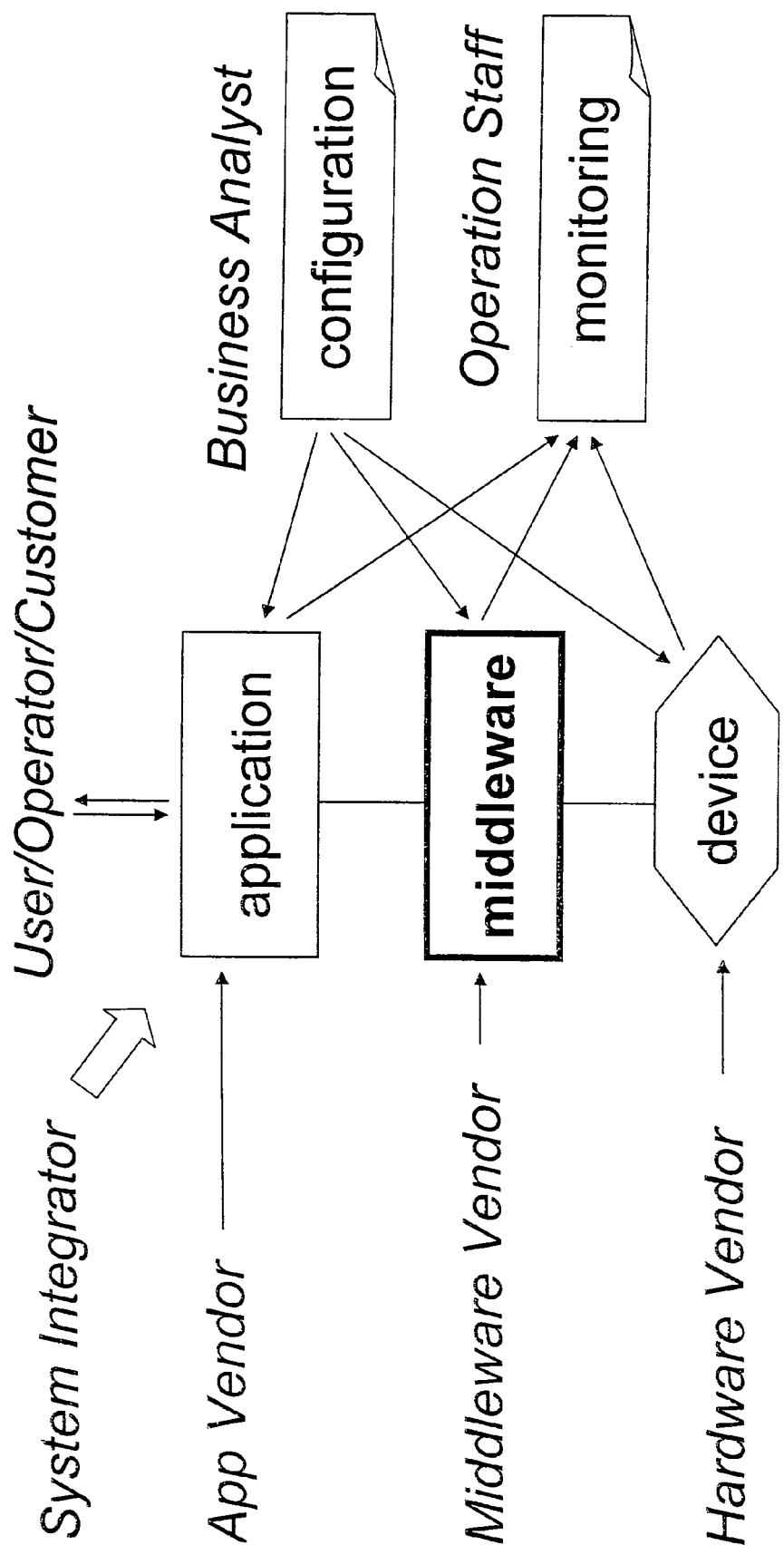
FIG. 15 illustrates an overall system model of the present invention, indicating that many entities can affect the middleware, and indicating a mechanism to incorporate constraints of different programming devices, or filters, into the system model.

FIG. 15 illustrates an Overall System Model, and indicates that many entities, each defining parts of a software system, can affect the middleware. In most systems, there are different models for the entities to inject their elements into a final system design. In the IDTag SDK there is a mechanism to incorporate constraints of the different sources, referred to herein as filters, or programming devices.

Figure 16:
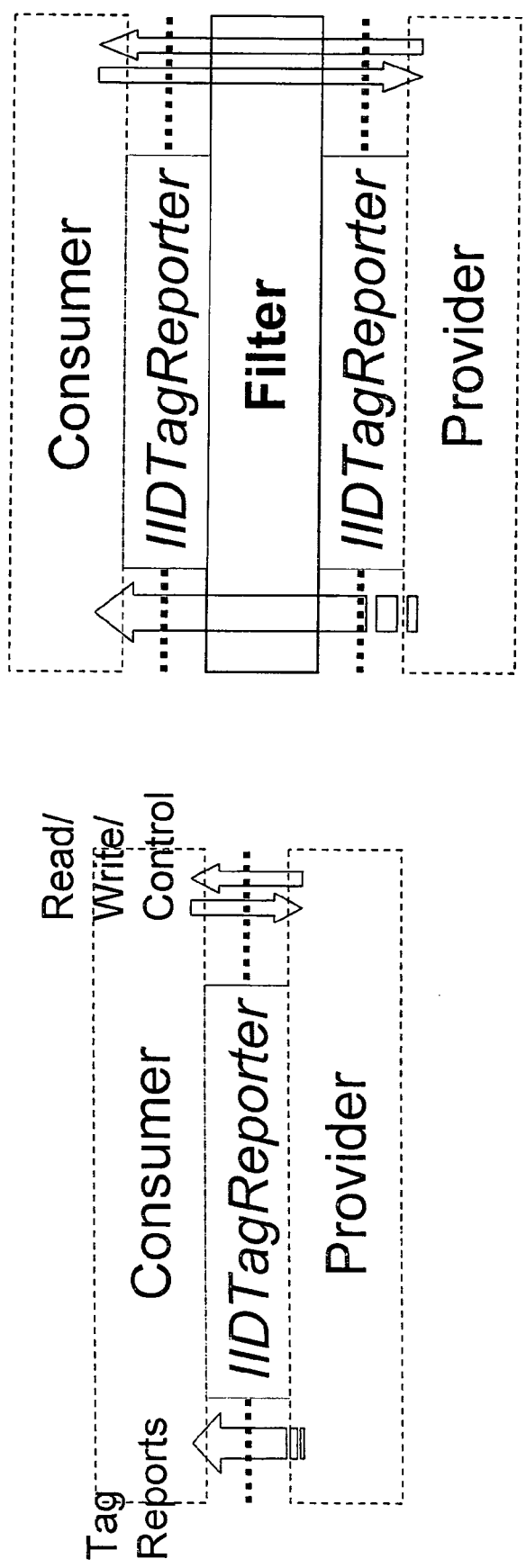
FIG. 16 illustrates an interface provided by the present invention for interaction between a provider of ID reports and a consumer of the ID reports.

FIG. 16 illustrates an interface between a provider of ID reports and a consumer of the ID reports. Previously, this specification referred to a reader and an application. Throughout this section the description may reference a provider and a consumer, because there can be many providers and consumers in a system. The IIDTagReporter is the interface through which they speak. Elements included and managed in the interface are: 1) configuration parameters that go from consumer to provider; 2) a set of scanning activities that a consumer forwards to a provider; 3) provider reports forwarded to a consumer including observations of tags in the form of events; and direct read, write and control operations in which a consumer desires to read, write or control a specific tag or set of tags, providing a direct interface from consumer to provider.

In the filter, a software object is defined that is both a consumer and a provider. Accordingly, there is a provider external to the filter that exposes and fulfills the IIDTagReporter interface. The filter receives that interface as a consumer, performs its process as it may desire and exposes the same interface to its own consumer. So the filter can perform an intermediate processing step that modifies the requests coming down from above, modifies the responses or reports coming up from below, or both. So, the filter is an object that both fulfills and consumers an IIDTagReporter interface.

Figure 17:
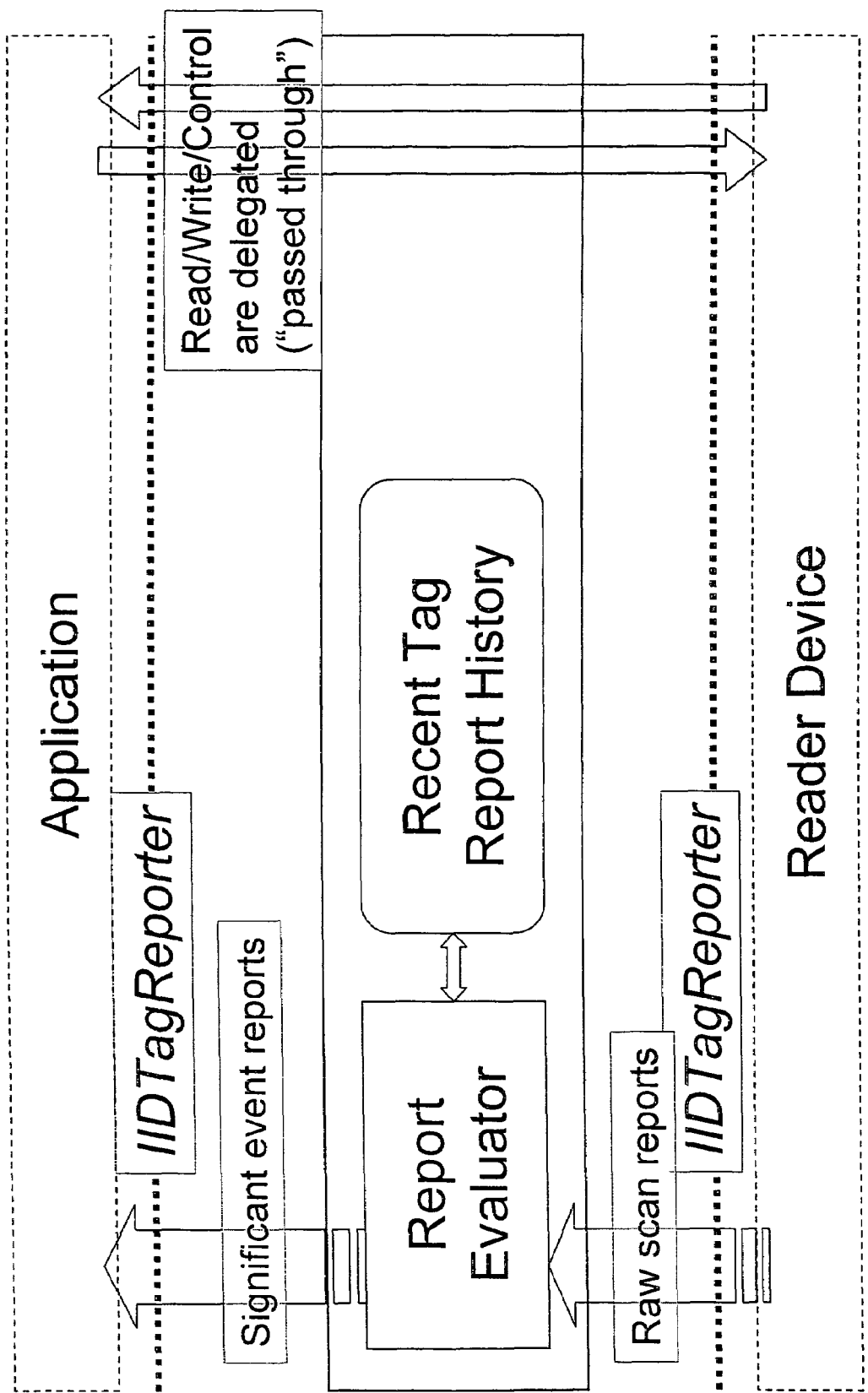
FIG. 17 illustrates a programming device of the present invention acting as a filter to provide event cleanup.
Figure 18:
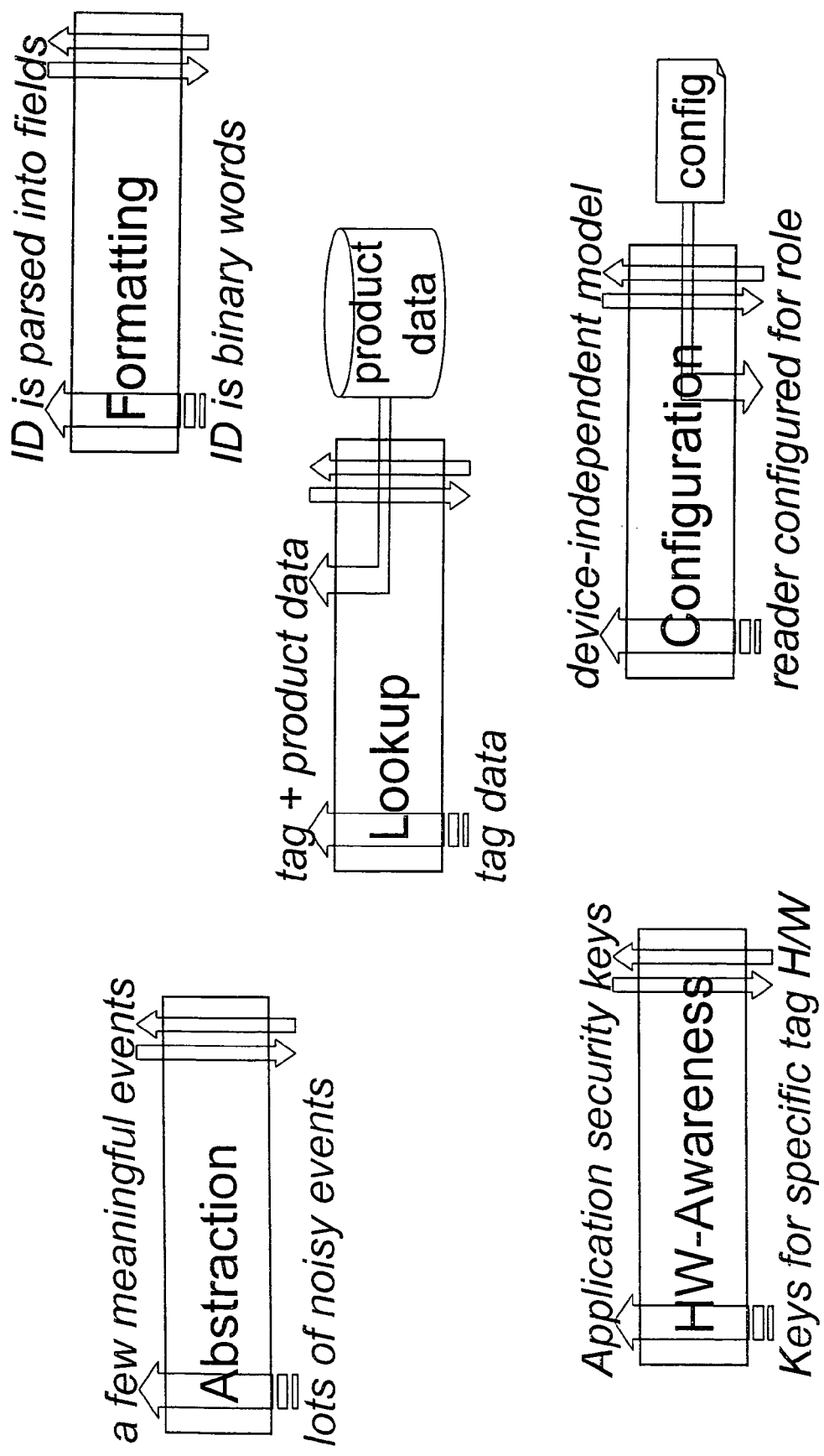
Figure 19:
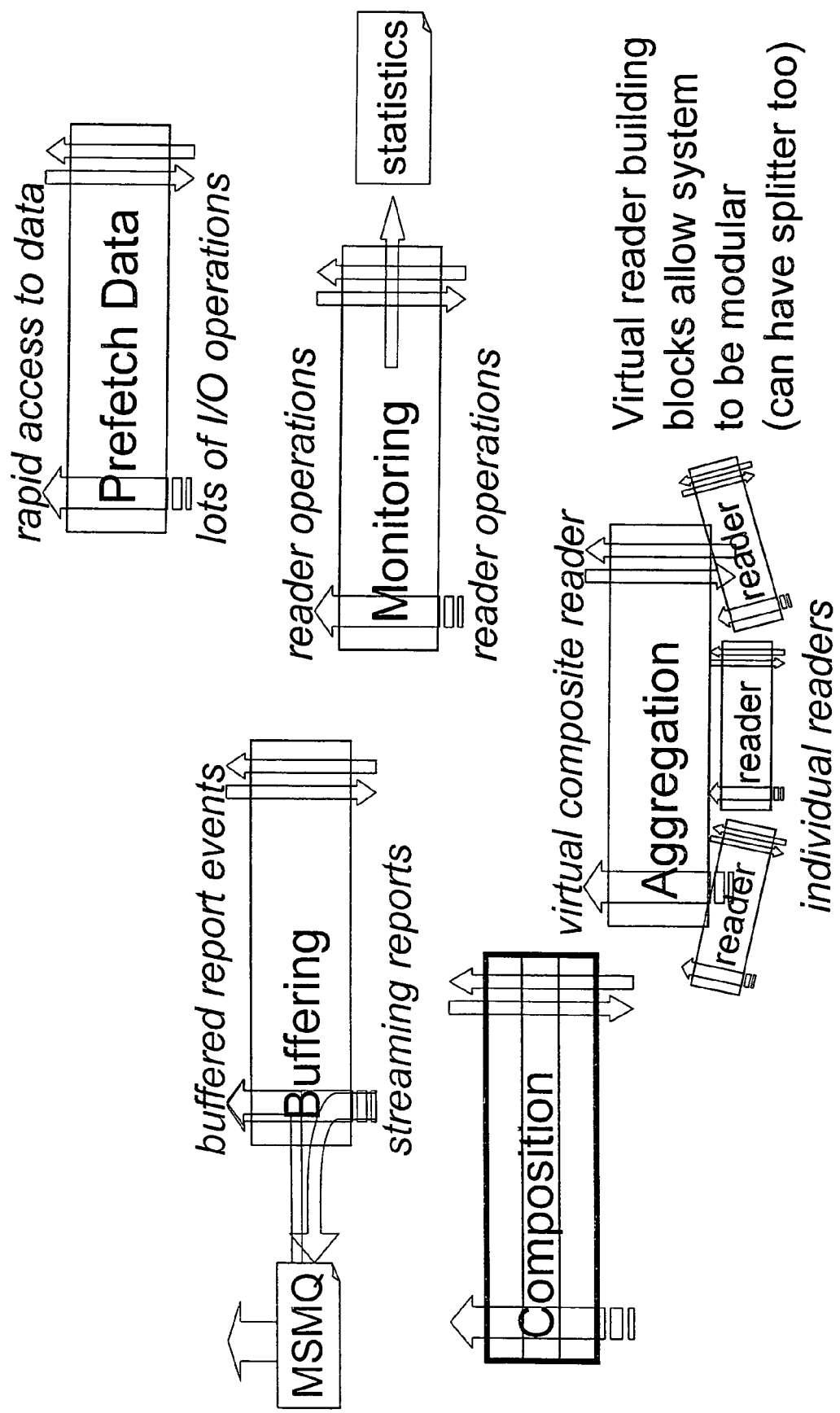
Figure 20:
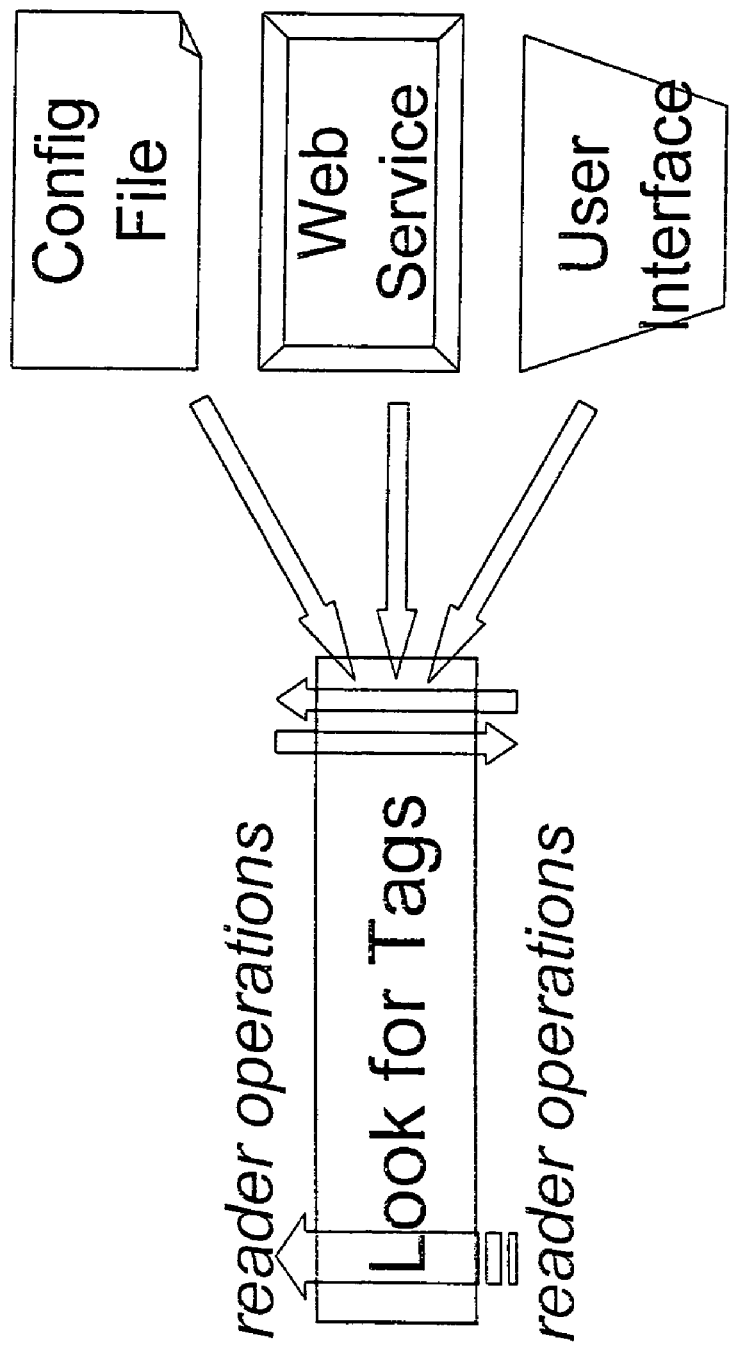

FIG. 17 illustrates one example of a filter, a filter providing event cleanup. Often readers present noisy data, or sometimes fail to include tags that are present. This is a typical failure mode of RFID, but applications want clean data, and reliable tag reports. The filter, shown in the middle of FIG. 17, accumulates information over multiple readings to determine which tags are reliable, and only reports reliable tags up to the application or consumer. The filter object intercepts raw scan reports from a lower level reader, performs processes to determine which scans are reliable, and reports only those reliable ones back up to the application. The filter does not interfere with read, write or control operations from an application, these are passed through the filter to the reader device without interference, as are responses thereto, which are forwarded back to an application.

FIGS. 18-22 illustrate other tasks accomplished through use of filters of the present invention. For instance, product look up, configuration information hiding hardware details, buffering data, producing statistics and traffic reports, and aggregating multiple readers to look like one single reader at a virtual level. Looking things up in a database, presenting a user interface, hopping over a network, can all be couched as a filter.

Figure 23:
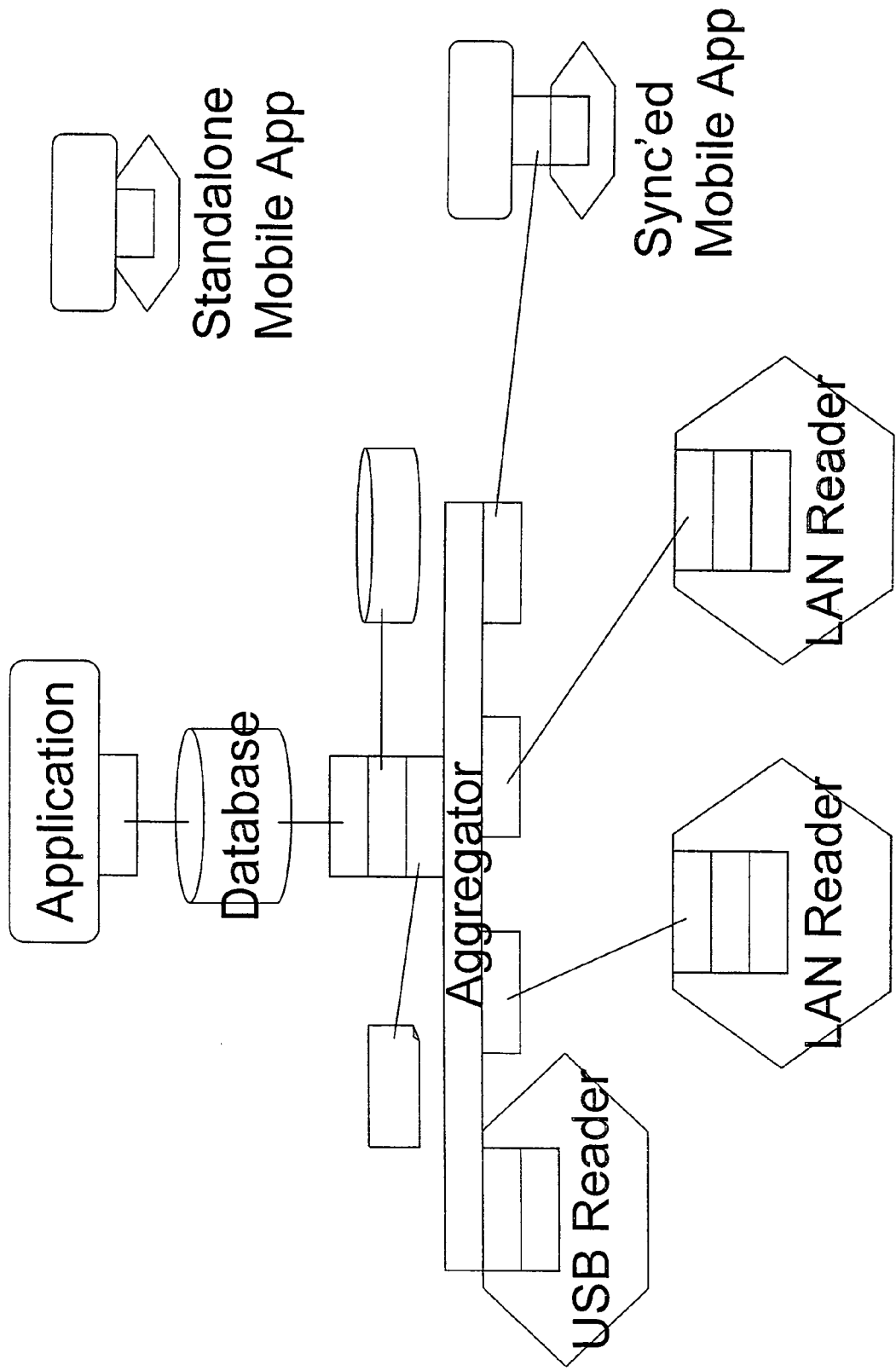
FIG. 23 illustrates one embodiment of a filter-based architecture of the present invention, showing development of an enterprise scale system, where filters are a primary building block for an RFID application interface.

FIG. 23 illustrates one embodiment of a filter-based architecture, showing development of an enterprise scale system, where filters are a primary building block for an RFID application interface. A filter can be as small as a single program sitting on a mobile device, or as large as a program covering a database and presenting an interface with the database. Accordingly, because the virtual reader design of the present invention consumes and exposes the same interface, the filters can be stacked, providing various outputs to various locations, and providing that various elements be grouped onto one, or different computers, and that a web service can be flexibly incorporated. The present invention differs from a traditional approach, where you locate a web service and implement it. In the present invention, a web service can be placed at any level, and can be relocated later in a different portion of the stack.

FIG. 21 illustrates Spanning the Network, or Network Hopping. In FIG. 21, a stack of filters is shown at "server operations." A web service is exposed, representing the reader plus its stack of filters through a network server exposing the web service. There is also a network client that accesses the web service. The client exposes to the application the same IIDTagReporter interface used elsewhere, effecting a transparent connection from the lower level stack on the reader (server operations) up to client operations, which views the reader as a server. What is provided is a single stack that hops over the network. Further, there could be many matches and many clients all connected to one server. So, a branch point is effectively provided. In FIG. 21, the network server and network client represent two halves of a single filter. At this point, the IIDTagReporter interface can both consume and produce. A variation is shown in the center of FIG. 21, where a stack comprises web service building blocks. A reader might end with a network server piece, having a building block beginning to a network client, with a stack on top of that, to an application beginning with a network client.

Figure 22:
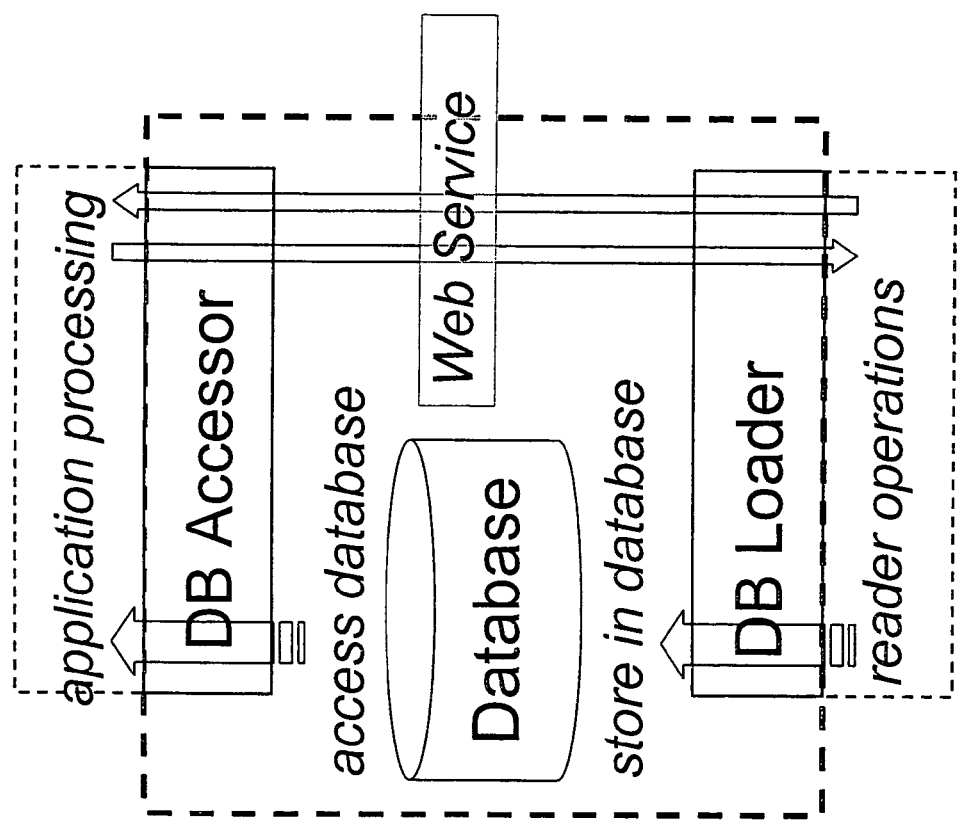

FIG. 22 illustrates Database-Hopping, where a stack is placed on the reader and ends with a proponent that loads data into a database. An application that wishes to fetch data from the database uses an accessor object, which is adequate for stored data, such as tag reports. However, if the application wants to perform a direct control operation, such as read or write, the accessor can expose the IIDTagReporter interface. To perform a direct operation, the application uses the IIDTagReporter interface to instruct the DB Accessor to perform the direct operation. The DB Accessor locates the DB loader and instructs of the operation. Locating the DB loader can be problematic, because of the difference in time between the direct operation and when the info was loaded, which could have occurred minutes ago, or hours ago. The present invention provides that the DB loader expose a web service that could be used by the Accessor, and that web service could be stored in the database. When the Accessor retrieves the data, it also has access to the URL. If the application requests a direct IO operation, the Accessor retrieves the URL, contacts that web service, which is the DB Loader, and tells the DB Loader what operation to perform. The DB loader can then communicate the operation down to the reader.

Figure 24:
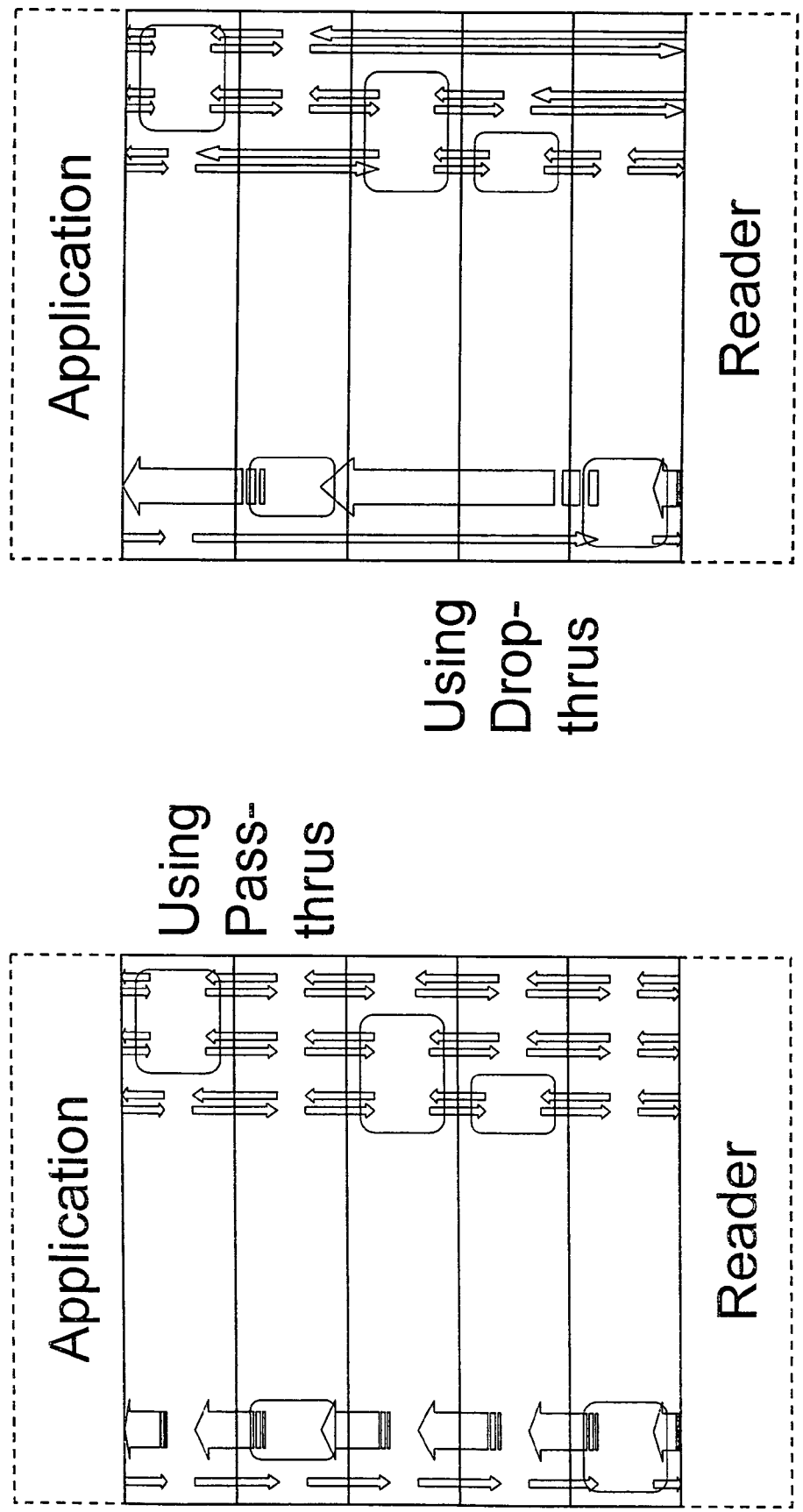
FIG. 24 illustrates a drop through design for filter stacks, in accordance with the present invention, where a top level filter can dispatch an operation directly down to a respective lower level filter that will implement the operation, thereby skipping all intermediate filter levels.

FIG. 24 illustrates a Drop-Thru design for Tall Filter Stacks. One issue that can arise with tall or long filter stacks is when a call originates from a top level that must be sent to a bottom level. This call must be forwarded to a next lower level, then to the next lower level, and so on, until reaching the respective lower level. This results in many calls, which are fast in operation, but are not free. It is therefore desirable to minimize the number of calls, or steps. The present invention includes a mechanism whereby an application can instruct a top level filter of the requested instruction. The top level filter can dispatch that operation directly down to the respective lower level filter that will implement that operation, thereby skipping all intermediate filter levels. Accordingly, all calls become a call of only one or two steps. A call is only one step if the top level filter receiving the instruction can implement the operation. A call is two steps if another level filter must implement the operation as received from the top level filter.

Similarly, the drop-through (or pass-through) mechanism can be used for events returned from a reader and forwarded up (as rapidly as possible) to a desired consumer. The present invention implements the mechanism by making the filter object model slightly more complex than the IIDTagReporter. The filter is a subclass of IIDTagReporter, having extensions, one of which is a table that records which level filter actually implements an event for every method, every event, and every property. The table is constructed from the bottom to the top, so that the lowest level reader essentially implements everything. The lowest level filter uses the table, which informs that the reader implements all operations, and only the methods implemented by the lowest level filter does the filter enter its own identity into the table. The table is passed to the next lowest level filter, which uses the table as received except that it enters its identity in the table for each method, property or event that it implements. As the table passes up through the level of stacks, objects are created and filters are substantiated. By the time the table reaches the top level filter, the table is a completed directory of where the reader can dispatch all the events that it receives.

A given level of filter need not consult the table if it implements a method itself. A given level of filter need only consult the table for those methods that it does not implement. However, a default object definition for a filter would have the filter consulting the table for every method, property and event. If a filter is created by subclassing, the filter object model would provide overrides for specific methods, properties and events and when created, will stamp its own ID onto the corresponding elements of the table.

Further, each level of filter may have some additional parameters and control operations relevant to its processing. By the time events are passed up to an application, accumulation of passages can occur. So, it is not enough for a filter to simply pass through unique features from below, the filter must add and append its own unique features to the list. Accordingly, name collisions could result; for example, if a feature is exposed with a same name as that from a lower level. Resolution must then occur, such as appending the name of the filter level to each property, method, feature, etc.

There are many different kinds of pass-throughs in the IIDTag model. For example, some tags can generate messages to the reader without being scanned, known as tag generated events. Tag generated events can have associated data not understood by any component other than the particular hardware. The middleware may have to pass the associated data, and the tag generated event, all the way up to the application, even though the middleware doesn't know how to process the data. Accordingly, many unique features can arise at the tag level, and at the reader level. All of these features require extensions in order to be propagated up to an application. Currently, the present invention implements the extensions by assimilating names of the respective features.

Accordingly, aspects of the invention, possibly implemented in software, include receiving scan activity instructions from one or more consumers regarding AutoID Tags, forwarding the instructions to one or more providers implementing the scan activity, receiving responses to the instructions from the one or more providers and forwarding the responses to the one or more consumers, both fulfilling and consuming an ID Tag reader interface.

The process could further include accumulating information over multiple scanning activities, determining which AutoID Tags scanned are reliable based upon the information accumulated, and forwarding only responses directed to the reliable AutoID Tags to the one or more consumers. These further included tasks can be adapted to not interfere with any specific instruction from a consumer to read, write or control one or more specific AutoID Tags.

Any one or more of the following tasks could also be performed prior to forwarding the responses to the one or more consumer:
retrieving product data from a database based upon the responses from the one or more providers;
parsing binary identification data into fields;
abstracting noisy response events into meaningful events;
configuring information to hide hardware details associated with the one or more providers;
buffering data;
producing statistics and traffic reports based upon the responses from the one or more providers;
aggregating multiple providers as one provider as viewed from the one or more consumers;
hopping over a network, and
presenting a user interface to various services.

Further, the invention can define an interface stackable between one or more consumers and providers, and multiple stacked interfaces can provide multiple outputs and inputs for AutoID Tag manipulation between the one or more consumers and providers.

In another aspect, computer-executable components include a provider that implements a scan of one or more ID tags for retrieval of information relevant to the ID tags, a consumer that receives and uses the information relevant to the ID tags, and an interface providing communication between the provider and the consumer. The interface can include configuration parameters from the consumer to the provider, scanning activity instructions from the consumer to the provider, and provider reports for the consumer.

Provider reports can include observations of the tags in a form of events and direct read, write and control instructions from the consumer directed to a specific tag or set of tags, providing direct communication from the consumer to the provider for the direct read, write and control instructions.

A plurality of interfaces can be included, where at least one interface is associated with the provider and at least one interface is associated with the consumer. Programming devices can exist between the plurality of interfaces so that the programming device(s) receives the interface associated with the provider as a consumer, and receives the interface associated with the consumer as a provider, allowing the programming device to perform intermediate processing steps, modifying requests coming down from the consumer and responses or reports coming up from the provider, or both. The intermediate processing steps could include, among other things, the steps listed above.

Report evaluators and a database could also be included, allowing the programming device(s) to receive provider reports, accumulate information in the database over multiple receivings of provider reports, and determine which tags are reliable using the report evaluator, providing a filtering where only reliable tags provided in the provider reports are forwarded to the consumer.

Programming device performance can be adapted to not interfere with direct read, write or control operations from an consumer, so that the direct read, write or control operations are passed through the programming device to the provider without interference, and responses thereto are passed through the programming device to the consumer without interference.

A plurality of programming devices could be included, where, in one example, at least two programming devices are stacked to allow adjacent communication with one another. In this example, one programming device external in the stack receives the interface associated with the provider, and another programming device external in the stack receives the interface associated with the consumer. The stack of programming devices provides various outputs to various locations, provides that various elements be grouped onto one or different computers, and provides that a web service can be flexibly incorporated anywhere in the stack of programming devices.

The stacked programming devices also allow adjacent communication between one another, so that a web service could be established between two of the stacked programming devices, providing a transparent connection between the stacked programming devices. The web service could include at least one network server and at least one network client communicating over a network, so that the stacked programming devices allow the stack of programming devices to hop over the network.

A database can also be included, along with a database loader in association with the provider, and a database accessor in association with the consumer, providing that, when the consumer requests a direct control operation concerning a tag and the consumer instructs the database accessor to perform the direct operation through the interface associated with the consumer, the database accessor instructs the database loader, by way of the web service, to perform the direct operation with the database or the provider. The web service can be stored in the database and the database accessor can have access to a URL of the web service, so that the database accessor, to perform a direct operation, retrieves the URL, contacts the web service and the database loader, and instructs the database loader to perform the direct operation.

Stacked programming devices also allow that one programming device external in the stack can receive the interface associated with the provider (at a lowest level programming device), and that another programming device external in the stack can receive the interface associated with the consumer (at a top level programming device), to provide a pass-through mechanism that, when the consumer instructs the top level programming device to perform an operation, the top level programming device transmits the instruction directly to a respective lower level filter that will implement the operation so that transmission of the instruction does not require passage through all intermediate programming devices.

The pass-through mechanism can have stored thereon a data structure including extensions such as a table that records which level filter implements a respective operation for every method, event, and property possibly tasked. The extensions could further include unique features of a respective programming device, such as tag generated events.

IDTag Reports

An IDTag Report is a record of an IDTag condition, situated at a given time and place. Reports may be used to record the observations of radio hardware, the inferences derived from these observations, and current beliefs about the state of an IDTag.

An IDTagReportList holds a list of IDTagReport objects. While it presents the list to users as an array, the internal representation uses ArrayList so reports can be added easily as the IDTagReportList is being created.

When it is being created, the IDTagReportList accumulates reports. As it does, it automatically keeps track of two circumstances:

If the reports are added in ascending order of ID (and timestamp for equal IDs), then the IDTagReportList is considered to be "sorted". (Alternatively, the caller can use the Sort method to sort the reports in ascending order by ID and timestamp.)

If all the reports have the same IDTag template, then this property is copied into the IDTagReportList itself. Otherwise, this property of the IDTagReportList will be null. Similarly, the ID templates, conditions, sources, locations, and timestamps of all the reports are compared, and if they are all the same, then the corresponding property will be recorded in the IDTagReportList. This way, an application can determine very quickly what properties are in common among the reports in the IDTagReportList.

An IDTagReportList is optimized for sequential processing, particularly in order of increasing ID. However, it is sometimes desirable to process reports based on randomly ordered tag IDs. To facilitate this, the IDTagReportDictionary is a specialized IDTagReportList that also supports retrieving reports by tag ID, and deleting reports. It can be thought of as an IDTagReportList with an internal Hashtable that has the same set of reports as contents, allowing both sequential and random retrieval with high efficiency. Deletion is not especially efficient, however. An IDTagReportList can contain at most one IDTagReport for a given ID; adding an additional report will overwrite any previously stored report with the same ID.

CONCLUSION

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A computer-readable medium having computer-executable instructions that are executable for operating as a unified ID Tag reader interface between one or more providers that may obtain ID information from diverse types of AutoID tags and one or more consumers that receive and use the ID information, wherein the unified ID Tag reader interface is stackable between one or more consumers and providers, and wherein multiple stacked interfaces provide multiple outputs and inputs for AutoID Tag manipulation between the one or more consumers and providers, the computer-executable instructions configured for performing steps comprising:
   receiving scan activity instructions from the one or more consumers;
   performing a first intermediate processing step before forwarding the instructions to the one or more providers for implementing the scan activity;
   receiving responses to the instructions from the one or more providers; and
   performing a second intermediate processing step before forwarding the responses to the one or more consumers, the unified ID Tag reader interface operative as a single object model.

2. The computer-readable medium of claim 1, wherein the second intermediate processing step comprises:
   accumulating information over multiple scanning activities;
   determining which AutoID Tags scanned are reliable based upon the information accumulated; and
   forward only responses directed to the reliable AutoID Tags to the one or more consumers.

3. The computer-readable medium of claim 2, wherein accumulating information over multiple scanning activities, determining reliable AutoID Tags, and forwarding only responses directed to the reliable AutoID Tags, does not interfere with any specific instruction from a consumer to read, write or control one or more specific AutoID Tags.

4. The computer-readable medium of claim 1, wherein the second intermediate processing step comprises:
   retrieving product data from a database based upon the responses from the one or more providers;
   parsing binary identification data into fields;
   abstracting noisy response events into meaningful events;
   configuring information to hide hardware details associated with the one or more providers;
   buffering data;
   producing statistics and traffic reports based upon the responses from the one or more providers;
   aggregating multiple providers as one provider as viewed from the one or more consumers;
   hopping over a network, and
   presenting a user interface to various services.

5. A computer-readable medium having computer-executable components comprising:
   a provider that implements a scan of one or more ID tags for retrieval of information relevant to the ID tags;
   a consumer that receives and uses the information relevant to the ID tags; and
   a plurality of interfaces providing communication between the provider and the consumer, wherein at least one interface is associated with the provider and at least one interface is associated with the consumer, the interface including:
   configuration parameters from the consumer to the provider;
   scanning activity instructions from the consumer to the provider; and
   provider reports for the consumer.

6. The computer-readable medium of claim 5, wherein the provider reports include:
   observations of the tags in a form of events; and
   direct read, write and control instructions from the consumer directed to a specific tag or set of tags, providing direct communication from the consumer to the provider for the direct read, write and control instructions.

7. The computer-readable medium of claim 5 having further computer-executable components comprising a programming device between the plurality of interfaces, wherein the programming device receives the interface associated with the provider as a consumer, and receives the interface associated with the consumer as a provider, whereby the programming device can perform intermediate processing steps, modifying requests coming down from the consumer and responses or reports coming up from the provider, or both.

8. The computer-readable medium of claim 7 having further computer-executable components comprising a report evaluator and a database, wherein the programming device performs a method including the steps of:
   receiving provider reports;
   accumulating information in the database over multiple receivings of provider reports; and
   determining which tags are reliable using the report evaluator, whereby only reliable tags provided in the provider reports are forwarded to the consumer.

9. The computer-readable medium of claim 8, wherein performance of the method steps by the programming device do not interfere with direct read, write or control operations from an consumer, whereby the direct read, write or control operations are passed through the programming device to the provider without interference, and responses thereto are passed through the programming device to the consumer without interference.

10. The computer-readable medium of claim 7, wherein intermediate processing steps include performance of one or more of the following:
   retrieving product data from a database based upon the provider reports;
   parsing binary identification data into fields;
   abstracting noisy events into meaningful events;
   configuring information to hide hardware details associated with the provider;
   buffering data;
   producing statistics and traffic reports based upon the provider reports;
   aggregating multiple providers as one provider as viewed from one or more consumers;
   hopping over a network, and
   presenting interaction with one or more external services.

11. The computer-readable medium of claim 7 having further computer-executable components comprising a plurality of programming devices, wherein at least two programming devices are stacked, allowing adjacent communication with one another; one programming device external in the stack receiving the interface associated with the provider, and another programming device external in the stack receiving the interface associated with the consumer, whereby the stack of programming devices provides various outputs to various locations, provides that various elements be grouped onto one or different computers, and provides that a web service can be flexibly incorporated anywhere in the stack of programming devices.

12. The computer-readable medium of claim 7 having further computer-executable components comprising a plurality of stacked programming devices, allowing adjacent communication with one another; wherein at least one web service is established between two of the stacked programming devices, whereby a transparent connection is effected between the two of the stacked programming devices.

13. The computer-readable medium of claim 12, wherein the web service includes at least one network server and at least one network client communicating over a network, whereby the two of the stacked programming devices allow the stack of programming devices to hop over the network.

14. The computer-readable medium of claim 12 having further computer-executable components comprising a database, a database loader in association with the provider, and a database accessor in association with the consumer; wherein, when the consumer requests a direct control operation concerning a tag; the consumer instructs the database accessor to perform the direct operation through the interface associated with the consumer; the database accessor instructs the database loader, by way of the web service, to perform the direct operation with the database or the provider.

15. The computer-readable medium of claim 14, wherein the web service is stored in the database and the database accessor has access to a URL of the web service, whereby the database accessor, to perform a direct operation, retrieves the URL, contacts the web service and the database loader, and instructs the database loader to perform the direct operation.

16. The computer-readable medium of claim 7 having further computer-executable components comprising a plurality of stacked programming devices, allowing adjacent communication with one another; one programming device external in the stack receiving the interface associated with the provider (lowest level programming device), and another programming device external in the stack receiving the interface associated with the consumer (top level programming device), and a pass-through mechanism, wherein, when the consumer instructs the top level programming device to perform an operation, the top level programming device transmits the instruction directly to a respective lower level filter that will implement the operation, thereby skipping transmission of the instruction through all intermediate programming devices.

17. The computer-readable medium of claim 16, wherein the pass-through mechanism has stored thereon a data structure comprising extensions including a table that records which level filter implements a respective operation for every method, event, and property possibly tasked.

18. The computer-readable medium of claim 17, wherein the extensions further include unique features of a respective programming device, including tag generated events.

19. A computer-readable medium having computer-executable components comprising:
 a provider that implements a scan of one or more ID tags for retrieval of information relevant to the ID tags;
 a consumer that receives and uses the information relevant to the ID tags; and
 a plurality of interfaces providing communication between the provider and the consumer, at least one interface being associated with the provider and at least one interface being associated with the consumer; and
 a plurality of programming devices, wherein at least two programming devices are stacked, allowing adjacent communication with one another; one programming device, at a bottom level of the stack, receiving the interface associated with the provider, and another programming device, at a top level of the stack, receiving the interface associated with the consumer, wherein the stack of programming devices provides various outputs to various locations, provides that various elements be grouped onto one or different computers, and provides that a web service can be flexibly incorporated anywhere in the stack of programming devices, and wherein the programming device can perform intermediate processing steps, modifying requests coming down from the consumer and responses or reports coming up from the provider, or both.

\* \* \* \* \*